US012794779B2

(12) United States Patent
Madegowda et al.

(10) Patent No.: US 12,794,779 B2
(45) Date of Patent: Nov. 10, 2026

(54) NODE DISCOVERY AND CONFIGURATION IN A DAISY-CHAINED NETWORK

(71) Applicant: Analog Devices, Inc., Wilmington, MA (US)

(72) Inventors: Naveen Kumar Kirgaval Madegowda, Northville, MI (US); Martin Kessler, Salem, MA (US)

(73) Assignee: Analog Devices, Inc., Wilmington, MA (US)

( * ) Notice: Subject to any disclaimer, the term of this patent is extended or adjusted under 35 U.S.C. 154(b) by 457 days.

(21) Appl. No.: 18/033,262

(22) PCT Filed: Oct. 20, 2021

(86) PCT No.: PCT/US2021/055763

§ 371 (c)(1),
(2) Date: Apr. 21, 2023

(87) PCT Pub. No.: WO2022/087076

PCT Pub. Date: Apr. 28, 2022

(65) Prior Publication Data

US 2023/0396504 A1 Dec. 7, 2023

Related U.S. Application Data

(60) Provisional application No. 63/094,720, filed on Oct. 21, 2020.

(51) Int. Cl.

*H04L 41/12* (2022.01)
*H04L 41/0816* (2022.01)
*H04L 12/12* (2006.01)

(52) U.S. Cl.

CPC .......... *H04L 41/12* (2013.01); *H04L 41/0816* (2013.01); *H04L 12/12* (2013.01)

(58) Field of Classification Search

None
See application file for complete search history.

(56) References Cited

U.S. PATENT DOCUMENTS

2002/0103945 A1* 8/2002 Owen ........................ H04L 9/40 710/10
2008/0155046 A1* 6/2008 Swain ................... H04L 12/417 709/208

(Continued)

FOREIGN PATENT DOCUMENTS

CN 107025200 A 8/2017

OTHER PUBLICATIONS

Zhang, Xiangyu et al., "Deploying IoT devices to make buildings smart: Performance evaluation and deployment experience", 2016 IEEE 3rd World Forum on Internet of Things (WF-IoT), pp. 530-535, Dec. 2016 (Year: 2016).*

(Continued)

*Primary Examiner* — Jason D Cardone
(74) *Attorney, Agent, or Firm* — ArentFox Schiff LLP

(57) ABSTRACT

Disclosed herein are systems and techniques for node discovery and configuration in a daisy-chained network. For example, in some embodiments, a main node may "auto-discover" the topology and identity of sub nodes in a daisy-chained network so that changes in the topology may be readily adapted to without substantial interruptions in data transfer in the network.

22 Claims, 19 Drawing Sheets

(56) References Cited

U.S. PATENT DOCUMENTS

| | | | | |
|---|---|---|---|---|
| 2009/0232326 | A1* | 9/2009 | Gordon | H04R 27/00 381/81 |
| 2010/0208621 | A1* | 8/2010 | Morper | H04W 8/005 370/255 |
| 2010/0280786 | A1* | 11/2010 | Gorbold | G06F 13/4247 702/120 |
| 2015/0286273 | A1* | 10/2015 | Tazebay | H04L 12/12 713/323 |
| 2015/0287390 | A1* | 10/2015 | Kakeko | H04L 61/5038 345/1.1 |
| 2015/0319043 | A1 | 11/2015 | Dibirdi et al. | |
| 2015/0358368 | A1* | 12/2015 | Wiseman | H04L 65/65 709/204 |
| 2016/0105320 | A1* | 4/2016 | Osterberg | H04L 67/125 709/208 |
| 2016/0149654 | A1* | 5/2016 | Whitby-Strevens | H04B 17/21 375/224 |
| 2017/0070195 | A1 | 3/2017 | Arknaes-Pedersen | |
| 2018/0091245 | A1* | 3/2018 | Leyrer | H04J 3/0655 |
| 2018/0181181 | A1* | 6/2018 | Dickey | G06F 1/3206 |
| 2019/0361711 | A1* | 11/2019 | Kim | H04L 69/323 |
| 2020/0044940 | A1* | 2/2020 | Thomasson | H04L 41/085 |
| 2020/0120202 | A1* | 4/2020 | Jakobsson | H04L 63/105 |
| 2021/0064564 | A1* | 3/2021 | Quiquempoix | G06F 13/4068 |
| 2021/0345083 | A1* | 11/2021 | Wang | H04W 24/04 |
| 2022/0335002 | A1* | 10/2022 | Li | G06F 13/4282 |
| 2022/0350773 | A1* | 11/2022 | Ryan | G06F 1/14 |
| 2023/0403179 | A1* | 12/2023 | Tarkoff | H04L 12/40169 |
| 2024/0378011 | A1* | 11/2024 | Thirumaleshwara | G06F 3/162 |
| 2025/0088340 | A1* | 3/2025 | Kessler | H04L 7/0033 |

OTHER PUBLICATIONS

Florin, Rastoceanu et al., "FPGA based architecture for securing IoT with blockchain", 2019 International Conference on Speech Technology and Human-Computer Dialogue (SpeD), pp. 1-8, Nov. 2019 (Year: 2019).*

International Search Report and Written Opinion issued in International Patent Application No. PCT/US2021/055763 on Jan. 21, 2022.

* cited by examiner

1700

1800

NODE DISCOVERY AND CONFIGURATION IN A DAISY-CHAINED NETWORK

CROSS-REFERENCE TO RELATED APPLICATIONS

This application is a 35 U.S.C. § 371 National Stage Application of International Patent Application No. PCT/US2021/055763, filed Oct. 20, 2021, which application claims the benefit of and priority to U.S. Provisional Patent Application No. 63/094,720, titled "NODE DISCOVERY AND CONFIGURATION IN A DAISY-CHAINED NETWORK," each of which applications is hereby incorporated herein by reference in its entirety.

FIELD OF THE DISCLOSURE

The present disclosure relates to systems and apparatuses in a daisy-chained network.

BACKGROUND

As electronic components decrease in size, and as performance expectations increase, more components are included in previously un-instrumented or less-instrumented devices. In some settings, the communication infrastructure used to exchange signals between these components (e.g., in a vehicle) has required thick and heavy bundles of cables.

This disclosure is intended to provide an overview of subject matter of the present patent application. It is not intended to provide an exclusive or exhaustive explanation of the invention. Further limitations and disadvantages of conventional and traditional approaches will become apparent to one of skill in the art, through comparison of such systems with some aspects of the present invention as set forth in the remainder of the present application with reference to the drawings.

SUMMARY OF THE DISCLOSURE

Disclosed herein are systems and techniques for node discovery and configuration in a daisy-chained network. For example, in some embodiments, a main node may "auto-discover" the topology and identity of sub nodes in a daisy-chained network so that changes in the topology may be readily adapted to without substantial interruptions in data transfer in the network.

According to one aspect, a method for node discovery and configuration in a daisy-chained network including a plurality of nodes comprises: determining at least one new sub-node has been added to the plurality of nodes; discovering the at least one new sub-node; reading module information for the at least one new sub-node; configuring the at least one new sub-node; configuring a system including the daisy-chained network, based on information from each of the plurality of nodes; and periodically triggering a discovery attempt, wherein the discovery attempt includes determining whether at least one newer sub-node has been added to the daisy-chained network.

In various examples, the at least one new sub-node includes a first new sub-node, and the at least one newer sub-node includes a second new sub-node that is added to the daisy-chained network after the first new sub-node was added to the daisy-chained network and configured. In various examples, the at least one newer sub-node includes a second new sub-node that is added to the daisy-chained network after the system was configured with the first new sub-node. In various examples, the at least one new sub-node includes a first set of new sub-nodes, and the at least one newer sub-node includes a second new sub-node that is added to the daisy-chained network after the first set of new sub-nodes was added to the daisy-chained network and configured. In various examples, the at least one newer sub-node includes a second new sub-node that is added to the daisy-chained network after the system was configured with the first set of new sub-nodes. In various examples, the at least one new sub-node includes a first new sub-node, and the at least one newer sub-node includes a second set of new sub-nodes that is added to the daisy-chained network after the first new sub-node was added to the daisy-chained network and configured. In various examples, the at least one newer sub-node includes a second set of new sub-nodes that is added to the daisy-chained network after the system was configured with the first new sub-node. In various examples, the at least one new sub-node includes a first set of new sub-nodes, and the at least one newer sub-node includes a second set of new sub-nodes that is added to the daisy-chained network after the first set of new sub-nodes was added to the daisy-chained network and configured. In various examples, the at least one newer sub-node includes a second set of new sub-nodes that is added to the daisy-chained network after the system was configured with the first set of new sub-nodes.

According to some implementations, determining that at least one new sub-node has been added to the plurality of nodes further comprises bus self-discovery, wherein a host controller queries the plurality of nodes present in the network. According to some implementations, bus self-discovery occurs at system start up. According to some implementations, bus-self-discovery includes determining a number of nodes in the plurality of nodes.

According to some implementations, the plurality of nodes is a first plurality of nodes and the method further comprises: detecting a disconnection of a current node from the first plurality of nodes, and reconfiguring the system based on information from each of a second plurality of nodes, wherein the second plurality of nodes includes connected nodes from the first plurality of nodes. According to some implementations, the method further comprises detecting a reconfiguration of a first sub-node from the plurality of nodes.

According to some implementations, the method further comprises: reading module information for the first sub-node; configuring the first sub-node; and reconfiguring the system based on information from each of the plurality of nodes. According to some implementations, the plurality of nodes is a first plurality of nodes, wherein the first plurality of nodes plus the at least one newer sub-node is a second plurality of nodes, and the method further comprises, when the at least one newer sub-node has been added: reading module information for the at least one newer sub-node; configuring the at least one newer sub-node; and reconfiguring the system based on information from each of the second plurality of nodes.

According to another aspect, a system for node discovery and configuration, comprises: a daisy-chained network of nodes including a plurality of nodes; a host configured to: discover at least one new sub-node added to the plurality of nodes; read module information for the at least one new sub-node; configure the at least one new sub-node; configure the system including the daisy-chained network based on information from each of the plurality of nodes; and periodically trigger a discovery attempt, wherein the discovery attempt includes determining whether at least one newer sub-node has been added to the daisy-chained network.

According to some implementations at least one new sub-node includes a memory, and the memory includes the module information. According to some implementations, the host is configured to use the module information to find stored code for configuring the at least one new sub-node. According to some implementations, the module information includes at least one of vendor information, product information, version information, model information, capability information, serial number, make information, configuration information, routing information, authentication information, and calibration coefficients. According to some implementations, the host is further configured to determine an access method for the module information. According to some implementations, the system includes a plurality of slots and wherein the host is further configured to assigned at least one of the plurality of slots to each of the plurality of sub-nodes.

According to another aspect, a method for finding configuration information for a sub-node in a daisy-chained network, comprises: determining a module information access method; reading a module identifier; determining whether the module identifier matches with an expected value; reading module information via the access method; determining register settings for the sub-node based on the module information; applying register settings to the sub-node; and assigning at least one slot to the node.

According to some implementations, the method further comprises writing sub-node information to a main node. According to some implementations, the method further comprises. assigning an audio channel to the sub-node and communicating the audio channel assignment to a main node. According to some implementations, the method further comprises applying sub-node peripheral register settings to at least one sub-node peripheral device. According to some implementations, the method further comprises determining whether there is an additional sub-node and configuring the additional sub-node.

According to some implementations, reading module information comprises reading at least one of version information, vendor information, product information, capability information, serial number, make information, model information, configuration information, routing information, authentication information, and calibration coefficients.

BRIEF DESCRIPTION OF THE DRAWINGS

The present disclosure is best understood from the following detailed description in conjunction with the accompanying drawings. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. To facilitate this description, like reference numerals designate like structural elements. Embodiments are illustrated by way of example, not by way of limitation, in the figures of the accompanying drawings.

For a fuller understanding of the nature and advantages of the present invention, reference is made to the following detailed description of preferred embodiments and in connection with the accompanying drawings, in which.

DETAILED DESCRIPTION

Disclosed herein are systems and techniques for node discovery and configuration in a daisy-chained network. For example, in some embodiments, a main node may "auto-discover" the topology and identity of sub nodes in a daisy-chained network so that changes in the topology may be readily adapted to without substantial interruptions in data transfer in the network.

In the following detailed description, reference is made to the accompanying drawings which form a part hereof wherein like numerals designate like parts throughout, and in which is shown by way of illustration embodiments that may be practiced. It is to be understood that other embodiments may be utilized, and structural or logical changes may be made, without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Various components may be referred to or illustrated herein in the singular (e.g., a "processor," a "peripheral device," etc.), but this is simply for ease of discussion, and any element referred to in the singular may include multiple such elements in accordance with the teachings herein.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. As used herein, the term "circuitry" may refer to, be part of, or include an application-specific integrated circuit (ASIC), an electronic circuit, and optical circuit, a processor (shared, dedicated, or group), and/or memory (shared, dedicated, or group) that execute one or more software or firmware programs, a combinational logic circuit, and/or other suitable hardware that provide the described functionality.

Figure 1:
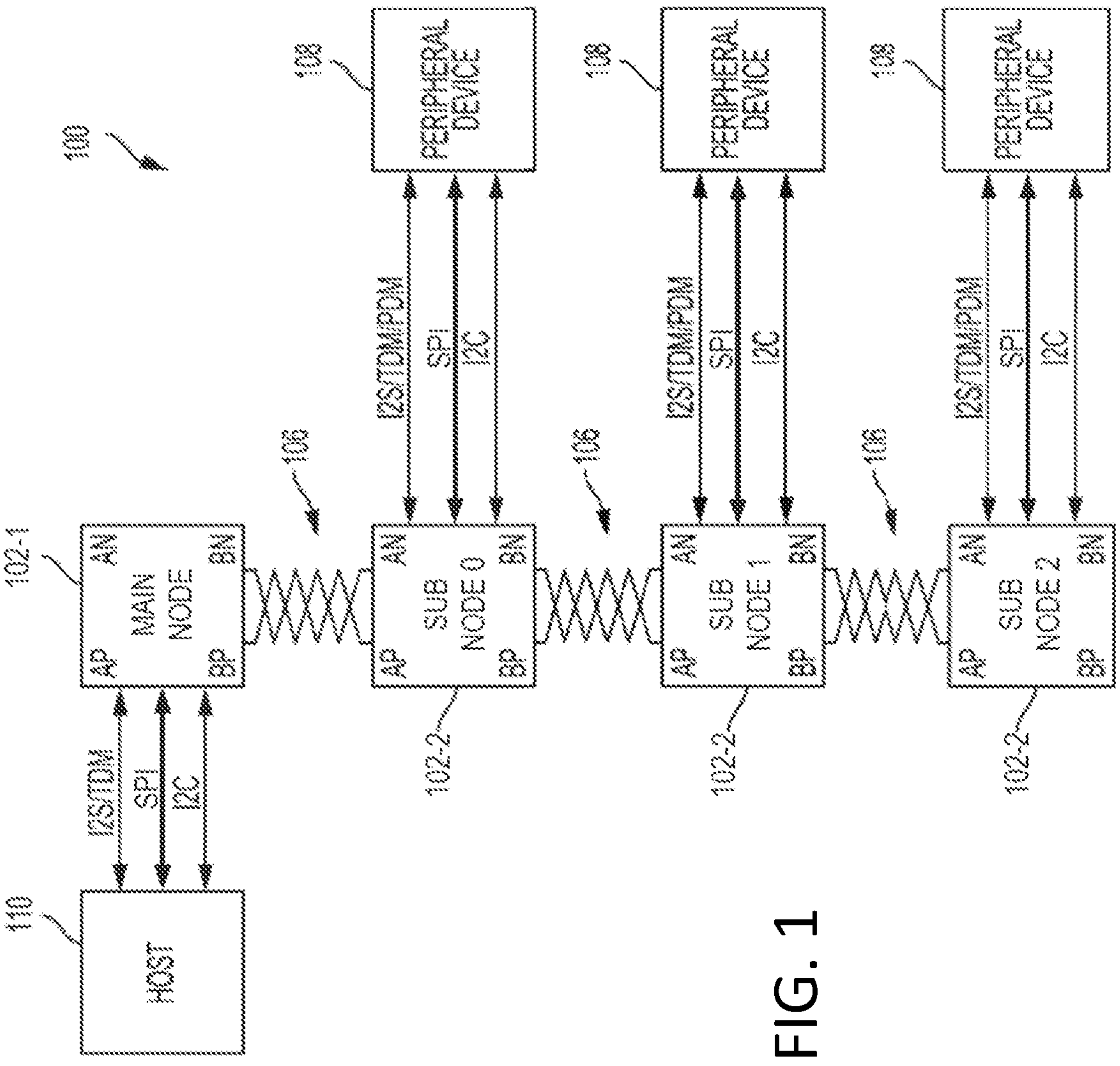
FIG. 1 is a block diagram of an illustrative two-wire communication system, in accordance with various embodiments.

FIG. 1 is a block diagram of an illustrative half-duplex two-wire communication system 100, in accordance with various embodiments. The system 100 includes a host 110, a main node 102-1 and at least one sub node 102-2. In FIG. 1, three sub nodes (0, 1, and 2) are illustrated. The depiction of three sub nodes 102-2 in FIG. 1 is simply illustrative, and the system 100 may include one, two, or more sub nodes 102-2, as desired.

The main node 102-1 may communicate with the sub nodes 102-2 over a two-wire bus 106. The bus 106 may include different two-wire bus links between adjacent nodes along the bus 106 to connect the nodes along the bus 106 in a daisy-chain fashion. For example, as illustrated in FIG. 1, the bus 106 may include a link coupling the main node 102-1 to the sub node 0, a link coupling the sub node 0 to the sub node 1, and a link coupling the sub node 1 to the sub node 2. In some embodiments, the links of the bus 106 may each be formed of a single twisted-wire pair (e.g., an unshielded twisted pair). In some embodiments, the links of the bus 106 may each be formed of a coax cable (e.g., with the core providing the "positive" line and the shield providing the "negative" line, or vice versa). The two-wire bus links together provide a complete electrical path (e.g., a forward and a return current path) so that no additional ground or voltage source lines need be used.

The host 110 may include a processor that programs the main node 102-1, and acts as the originator and recipient of various payloads transmitted along the bus 106. In some embodiments, the host 110 may be or may include a microcontroller, for example. In particular, the host 110 may be the master of Inter-Integrated Circuit Sound (I2S) communications that happen along the bus 106. The host 110 may communicate with the main node 102-1 via an I2S/Time Division Multiplex (TDM) protocol, a Serial Peripheral Interface (SPI) protocol, and/or an Inter-Integrated Circuit (I2C) protocol. In some embodiments, the main node 102-1 may be a transceiver (e.g., the node transceiver 120 discussed below with reference to FIG. 2) located within a same housing as the host 110.

The main node 102-1 may be programmable by the host 110 over the I2C bus for configuration and read-back, and may be configured to generate clock, synchronization, and framing for all of the sub nodes 102-2. In some embodiments, an extension of the I2C control bus between the host 110 and the main node 102-1 may be embedded in the data streams transmitted over the bus 106, allowing the host 110 direct access to registers and status information for the one or more sub nodes 102-2, as well as enabling I2C-to-I2C communication over distance to allow the host 110 to control the peripheral devices 108. In some embodiments, an extension of the SPI control bus between the host 110 and the main node 102-1 may be embedded in the data streams transmitted over the bus 106, allowing the host 110 direct access to registers and status information for the one or more sub nodes 102-2, as well as enabling SPI-to-SPI or SPI-to-I2C communication over distance to allow the host 110 to control the peripheral devices 108. In embodiments in which the system 100 is included in a vehicle, the host 110 and/or the main node 102-1 may be included in a headend of the vehicle.

The main node 102-1 may generate "downstream" signals (e.g., data signals, power signals, etc., transmitted away from the main node 102-1 along the bus 106) and receive "upstream" signals (e.g., transmitted toward the main node 102-1 along the bus 106). The main node 102-1 may provide a clock signal for synchronous data transmission over the bus 106. As used herein, "synchronous data" may include data streamed continuously (e.g., audio signals) with a fixed time interval between two successive transmissions to/from the same node along the bus 106. In some embodiments, the clock signal provided by the main node 102-1 may be derived from an I2S input provided to the main node 102-1 by the host 110. A sub node 102-2 may be an addressable network connection point that represents a possible destination for data frames transmitted downstream on the bus 106 or upstream on the bus 106. A sub node 102-2 may also represent a possible source of downstream or upstream data frames. The system 100 may allow for control information and other data to be transmitted in both directions over the bus 106 from one node to the next. One or more of the sub nodes 102-2 may also be powered by signals transmitted over the bus 106.

In particular, each of the main node 102-1 and the sub nodes 102-2 may include a positive upstream terminal (denoted as "AP"), a negative upstream terminal (denoted as "AN"), a positive downstream terminal (denoted as "BP"), and a negative downstream terminal (denoted as "BN"). The positive and negative downstream terminals of a node may be coupled to the positive and negative upstream terminals of the adjacent downstream node, respectively. As shown in FIG. 1, the main node 102-1 may include positive and negative upstream terminals, but these terminals may not be used; in other embodiments, the main node 102-1 may not include positive and negative upstream terminals. The last sub node 102-2 along the bus 106 (the sub node 2 in FIG. 1) may include positive and negative downstream terminals, but these terminals may not be used; in other embodiments, the last sub node 102-2 along the bus may not include positive and negative downstream terminals.

As discussed in detail below, the main node 102-1 may periodically send a synchronization control frame downstream, optionally along with data intended for one or more of the sub nodes 102-2. For example, the main node 102-1 may transmit a synchronization control frame every 1024 bits (representing a superframe) at a frequency of 48 kHz, resulting in an effective bit rate on the bus 106 of 49.152

Mbps. Other rates may be supported, including, for example, 44.1 kHz. The synchronization control frame may allow the sub nodes 102-2 to identify the beginning of each superframe and also, in combination with physical layer encoding/signaling, may allow each sub node 102-2 to derive its internal operational clock from the bus 106. The synchronization control frame may include a preamble for signaling the start of synchronization, as well as control fields that allow for various addressing modes (e.g., normal, broadcast, discovery), configuration information (e.g., writing to registers of the sub nodes 102-2), conveyance of I2C information, conveyance of SPI information, remote control of certain general-purpose input/output (GPIO) pins at the sub nodes 102-2, and other services. A portion of the synchronization control frame following the preamble and the payload data may be scrambled in order to reduce the likelihood that information in the synchronization control frame will be mistaken for a new preamble, and to flatten the spectrum of related electromagnetic emissions.

The synchronization control frame may get passed between sub node 102-2 (optionally along with other data, which may come from the main node 102-1 but additionally or alternatively may come from one or more upstream sub nodes 102-2 or from a sub node 102-2 itself) until it reaches the last sub node 102-2 (i.e., the sub node 2 in FIG. 1), which has been configured by the main node 102-1 as the last sub node 102-2 or has self-identified itself as the last sub node 102-2. Upon receiving the synchronization control frame, the last sub node 102-2 may transmit a synchronization response frame followed by any data that it is permitted to transmit (e.g., a 24-bit audio sample in a designated time slot). The synchronization response frame may be passed upstream between sub nodes 102-2 (optionally along with data from downstream sub nodes 102-2), and based on the synchronization response frame, each sub node 102-2 may be able to identify a time slot, if any, in which the sub node 102-2 is permitted to transmit.

In some embodiments, one or more of the sub nodes 102-2 in the system 100 may be coupled to and communicate with a peripheral device 108. For example, a sub node 102-2 may be configured to read data from and/or write data to the associated peripheral device 108 using I2S, pulse density modulation (PDM), TDM, SPI, and/or I2C protocols, as discussed below. Although the "peripheral device 108" may be referred to in the singular herein, this is simply for ease of discussion, and a single sub node 102-2 may be coupled with zero, one, or more peripheral devices. Examples of peripheral devices that may be included in the peripheral device 108 may include a digital signal processor (DSP), a field programmable gate array (FPGA), an ASIC, an analog to digital converter (ADC), a digital to analog converter (DAC), a codec, a microphone, a microphone array, a speaker, an audio amplifier, a protocol analyzer, an accelerometer or other motion sensor, an environmental condition sensor (e.g., a temperature, humidity, and/or gas sensor), a wired or wireless communication transceiver, a display device (e.g., a touchscreen display), a user interface component (e.g., a button, a dial, or other control), a camera (e.g., a video camera), a memory device, or any other suitable device that transmits and/or receives data. A number of examples of different peripheral device configurations are discussed in detail herein.

In some embodiments, the peripheral device 108 may include any device configured for I2S communication; the peripheral device 108 may communicate with the associated sub node 102-2 via the I2S protocol. In some embodiments, the peripheral device 108 may include any device configured for I2C communication; the peripheral device 108 may communicate with the associated sub node 102-2 via the I2C protocol. In some embodiments, the peripheral device 108 may include any device configured for SPI communication; the peripheral device 108 may communicate with the associated sub node 102-2 via the SPI protocol. In some embodiments, a sub node 102-2 may not be coupled to any peripheral device 108.

A sub node 102-2 and its associated peripheral device 108 may be contained in separate housings and coupled through a wired or wireless communication connection or may be contained in a common housing. For example, a speaker connected as a peripheral device 108 may be packaged with the hardware for an associated sub node 102-2 (e.g., the node transceiver 120 discussed below with reference to FIG. 2), such that the hardware for the associated sub node 102-2 is contained within a housing that includes other speaker components. The same may be true for any type of peripheral device 108.

As discussed above, the host 110 may communicate with and control the main node 102-1 using multi-channel I2S, SPI, and/or I2C communication protocols. For example, the host 110 may transmit data via I2S to a frame buffer (not illustrated) in the main node 102-1, and the main node 102-1 may read data from the frame buffer and transmit the data along the bus 106. Analogously, the main node 102-1 may store data received via the bus 106 in the frame buffer, and then may transmit the data to the host 110 via I2S.

Each sub node 102-2 may have internal control registers that may be configured by communications from the main node 102-1. A number of such registers are discussed in detail below. Each sub node 102-2 may receive downstream data and may retransmit the data further downstream. Each sub node 102-2 may receive and/or generate upstream data and/or retransmit data upstream and/or add data to and upstream transaction.

Communications along the bus 106 may occur in periodic superframes. Each superframe may begin with a downstream synchronization control frame; be divided into periods of downstream transmission (also called "downstream portions"), upstream transmission (also called "upstream portions"), and no transmission (where the bus 106 is not driven); and end just prior to transmission of another downstream synchronization control frame. The main node 102-1 may be programmed (by the host 110) with a number of downstream portions to transmit to one or more of the sub nodes 102-2 and a number of upstream portions to receive from one or more of the sub nodes 102-2. Each sub node 102-2 may be programmed (by the main node 102-1) with a number of downstream portions to retransmit down the bus 106, a number of downstream portions to consume, a number of upstream portions to retransmit up the bus 106, and a number of upstream portions in which the sub node 102-2 may transmit data received from the sub node 102-2 from the associated peripheral device 108. Communication along the bus 106 is discussed in further detail below with reference to FIGS. 2-12.

Embodiments of the communication systems 100 disclosed herein are unique among conventional communication systems in that all sub nodes 102-2 may receive output data over the bus 106 within the same superframe (e.g., all sub nodes 102-2 may receive the same audio sample without sample delays between the nodes 102). In conventional communication systems, data is buffered and processed in each node before being passed downstream in the next frame to the next node. Consequently, in these conventional communication systems, the latency of data transmission depends on the number of nodes (with each node adding a delay of one audio sample). In the communication systems 100 disclosed herein, the bus 106 may only add one cycle of latency, no matter if the first or last sub node 102-2 receives the data. The same is true for upstream communication; data may be available at an upstream node 102 in the next superframe, no matter which sub node 102-2 provided the data.

Further, in embodiments of the communication systems 100 disclosed herein, downstream data (e.g., downstream audio data) may be put on the bus 106 by the main node 102-1 or by any of the sub nodes 102-2 that are upstream of the receiving sub node 102-2; similarly, upstream data (e.g., upstream audio data) may be put on the bus 106 by any of the sub nodes 102-2 that are downstream of the receiving node 102 (i.e., the main node 102-1 or a sub node 102-2). Such capability allows a sub node 102-2 to provide both upstream and downstream data at a specific time (e.g., a specific audio sample time). For audio data, this data can be received in the next audio sample at any downstream or upstream node 102 without further delays (besides minor processing delays that fall within the superframe boundary). As discussed further herein, control messages (e.g., in a synchronization control frame (SCF)) may travel to the last node 102 (addressing a specific node 102 or broadcast) and an upstream response (e.g., in a synchronization response frame (SRF)) may be created by the last downstream node 102 within the same superframe. Nodes 102 that have been addressed by the SCF change the content of the upstream SRF with their own response. Consequently, within the same audio sample, a control and a response may be fully executed over multiple nodes 102. This is also in contrast to conventional communication systems, in which sample latencies would be incurred between nodes (for relaying messages from one node to the other).

Figure 2:
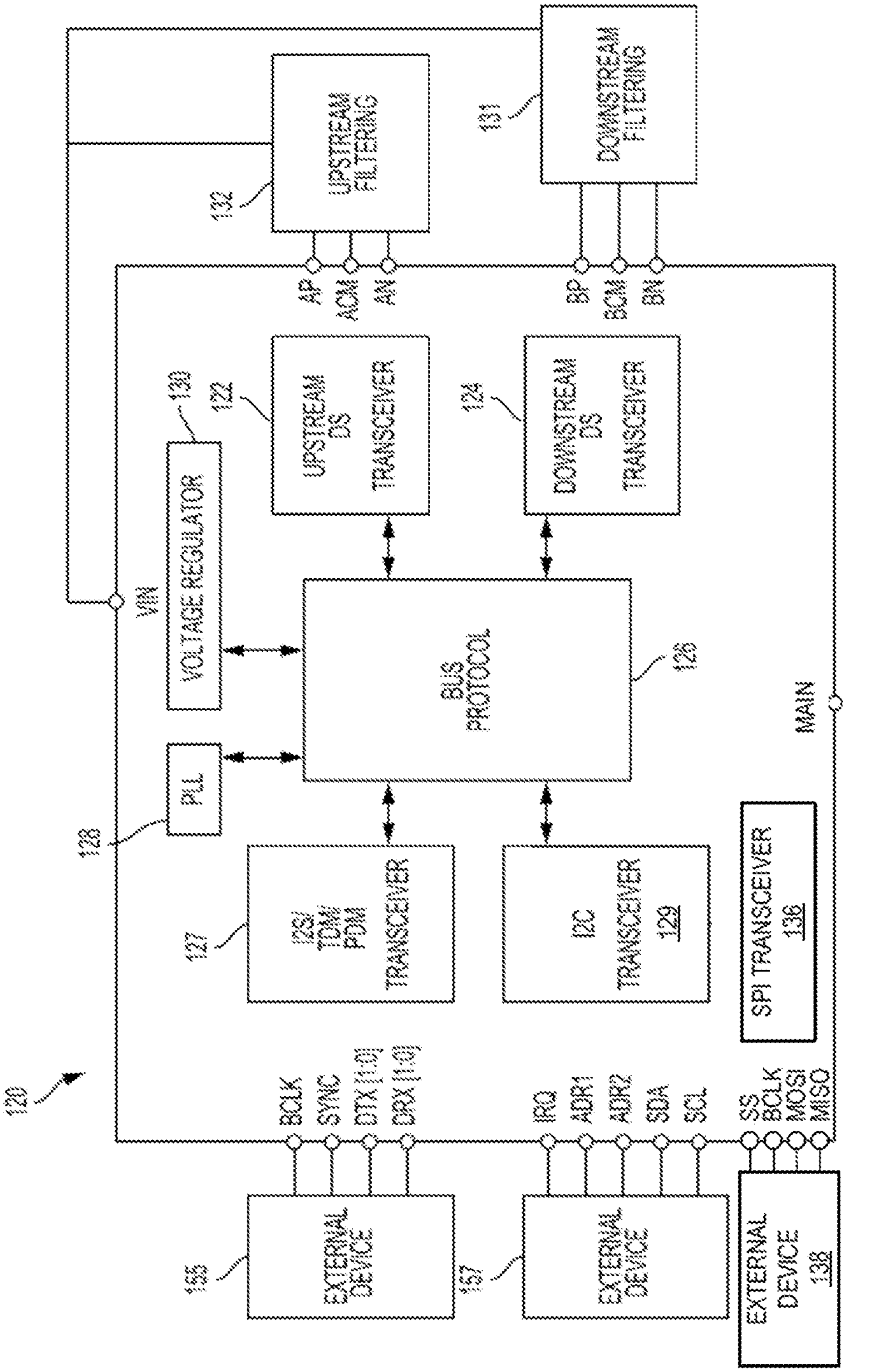
FIG. 2 is a block diagram of a node transceiver that may be included in a node of the system of FIG. 1, in accordance with various embodiments.

Each of the main node 102-1 and the sub nodes 102-2 may include a transceiver to manage communication between components of the system 100. FIG. 2 is a block diagram of a node transceiver 120 that may be included in a node (e.g., the main node 102-1 or a sub node 102-2) of the system 100 of FIG. 1, in accordance with various embodiments. In some embodiments, a node transceiver 120 may be included in each of the nodes of the system 100, and a control signal may be provided to the node transceiver 120 via a main (MAIN) pin to indicate whether the node transceiver 120 is to act as a main node (e.g., when the MAIN pin is high) or a sub node (e.g., when the MAIN pin is low).

The node transceiver 120 may include an upstream differential signaling (DS) transceiver 122 and a downstream DS transceiver 124. The upstream DS transceiver 122 may be coupled to the positive and negative upstream terminals discussed above with reference to FIG. 1, and the downstream DS transceiver 124 may be coupled to the positive and negative downstream terminals discussed above with reference to FIG. 1. In some embodiments, the upstream DS transceiver 122 may be a low voltage DS (LVDS) transceiver, and the downstream DS transceiver 124 may be an LVDS transceiver. Each node in the system 100 may be AC-coupled to the bus 106, and data signals may be conveyed along the bus 106 (e.g., via the upstream DS transceiver 122 and/or the downstream DS transceiver 124) using a predetermined form of DS (e.g., LVDS or Multipoint LVDS (MLVDS) or similar signaling) with appropriate encoding to provide timing information over the bus 106 (e.g., differential Manchester coding, biphase mark coding, Manchester coding, Non-Return-to-Zero, Inverted (NRZI) coding with run-length limiting, or any other suitable encoding).

The upstream DS transceiver 122 and the downstream DS transceiver 124 may communicate with bus protocol circuitry 126, and the bus protocol circuitry 126 may communicate with a phased locked loop (PLL) 128 and voltage regulator circuitry 130, among other components. When the node transceiver 120 is powered up, the voltage regulator circuitry 130 may raise a "power good" signal that is used by the PLL 128 as a power-on reset.

As noted above, one or more of the sub nodes 102-2 in the system 100 may receive power transmitted over the bus 106 concurrently with data. For power distribution (which is optional, as some of the sub nodes 102-2 may be configured to have exclusively local power provided to them), the main node 102-1 may place a DC bias on the bus link between the main node 102-1 and the sub node 0 (e.g., by connecting, through a low-pass filter, one of the downstream terminals to a voltage source provided by a voltage regulator and the other downstream terminal to ground). The DC bias may be a predetermined voltage, such as 5 volts, 8 volts, the voltage of a car battery, or a higher voltage. Each successive sub node 102-2 can selectively tap its upstream bus link to recover power (e.g., using the voltage regulator circuitry 130). This power may be used to power the sub node 102-2 itself (and optionally one or more peripheral device 108 coupled to the sub node 102-2). A sub node 102-2 may also selectively bias the bus link downstream for the next-in-line sub node 102-2 with either the recovered power from the upstream bus link or from a local power supply. For example, the sub node 0 may use the DC bias on the upstream link of the bus 106 to recover power for the sub node 0 itself and/or for one or more associated peripheral device 108, and/or the sub node 0 may recover power from its upstream link of the bus 106 to bias its downstream link of the bus 106.

Thus, in some embodiments, each node in the system 100 may provide power to the following downstream node over a downstream bus link. The powering of nodes may be performed in a sequenced manner. For example, after discovering and configuring the sub node 0 via the bus 106, the main node 102-1 may instruct the sub node 0 to provide power to its downstream link of the bus 106 in order to provide power to the sub node 1; after the sub node 1 is discovered and configured, the main node 102-1 may instruct the sub node 1 to provide power to its downstream link of the bus 106 in order to provide power to the sub node 2 (and so on for additional sub nodes 102-2 coupled to the bus 106). In some embodiments, one or more of the sub nodes 102-2 may be locally powered, instead of or in addition to being powered from its upstream bus link. In some such embodiments, the local power source for a given sub node 102-2 may be used to provide power to one or more downstream sub nodes.

In some embodiments, upstream bus interface circuitry 132 may be disposed between the upstream DS transceiver 122 and the voltage regulator circuitry 130, and downstream bus interface circuitry 131 may be disposed between the downstream DS transceiver 124 and the voltage regulator circuitry 130. Since each link of the bus 106 may carry AC (signal) and DC (power) components, the upstream bus interface circuitry 132 and the downstream bus interface circuitry 131 may separate the AC and DC components, providing the AC components to the upstream DS transceiver 122 and the downstream DS transceiver 124, and providing the DC components to the voltage regulator circuitry 130. AC couplings on the line side of the upstream DS transceiver 122 and downstream DS transceiver 124 substantially isolate the transceivers 122 and 124 from the DC component on the line to allow for high-speed bi-directional communications. As discussed above, the DC component may be tapped for power, and the upstream bus interface circuitry 132 and the downstream bus interface circuitry 131 may include a ferrite, a common mode choke, or an inductor, for example, to reduce the AC component provided to the voltage regulator circuitry 130. In some embodiments, the upstream bus interface circuitry 132 may be included in the upstream DS transceiver 122, and/or the downstream bus interface circuitry 131 may be included in the downstream DS transceiver 124; in other embodiments, the filtering circuitry may be external to the transceivers 122 and 124.

The node transceiver 120 may include a transceiver 127 for I2S, TDM, and PDM communication between the node transceiver 120 and an external device 155. Although the "external device 155" may be referred to in the singular herein, this is simply for ease of illustration, and multiple external devices may communicate with the node transceiver 120 via the I2S/TDM/PDM transceiver 127. As known in the art, the I2S protocol is for carrying pulse code modulated (PCM) information (e.g., between audio chips on a printed circuit board (PCB)). As used herein, "I2S/TDM" may refer to an extension of the I2S stereo (2-channel) content to multiple channels using TDM. As known in the art, PDM may be used in sigma delta converters, and in particular, PDM format may represent an over-sampled 1-bit sigma delta ADC signal before decimation. PDM format is often used as the output format for digital microphones. The I2S/TDM/PDM transceiver 127 may be in communication with the bus protocol circuitry 126 and pins for communication with the external device 155. Six pins, BCLK, SYNC, DTX[1:0], and DRX[1:0], are illustrated in FIG. 2; the BCLK pin may be used for an I2S bit clock, the SYNC pin may be used for an I2S frame synchronization signal, and the DTX[1:0] and DRX[1:0] pins are used for transmit and receive data channels, respectively. Although two transmit pins (DTX[1:0]) and two receive pins (DRX[1:0]) are illustrated in FIG. 2, any desired number of receive and/or transmit pins may be used.

When the node transceiver 120 is included in the main node 102-1, the external device 155 may include the host 110, and the I2S/TDM/PDM transceiver 127 may provide an I2S slave (regarding BCLK and SYNC) that can receive data from the host 110 and send data to the host 110 synchronously with an I2S interface clock of the host 110. In particular, an I2S frame synchronization signal may be received at the SYNC pin as an input from the host 110, and the PLL 128 may use that signal to generate clocks. When the node transceiver 120 is included in a sub node 102-2, the external device 155 may include one or more peripheral devices 108, and the I2S/TDM/PDM transceiver 127 may provide an I2S clock master (for BCLK and SYNC) that can control I2S communication with the peripheral device 108. In particular, the I2S/TDM/PDM transceiver 127 may provide an I2S frame synchronization signal at the SYNC pin as an output. Registers in the node transceiver 120 may determine which and how many I2S/TDM channels are being transmitted as data slots over the bus 106. A TDM mode (TDMMODE) register in the node transceiver 120 may store a value of how many TDM channels fit between consecutive SYNC pulses on a TDM transmit or receive pin. Together with knowledge of the channel size, the node transceiver 120 may automatically set the BCLK rate to match the number of bits within the sampling time (e.g., 48 kHz).

The node transceiver 120 may include a transceiver 129 for I2C communication between the node transceiver 120 and an external device 157. Although the "external device 157" may be referred to in the singular herein, this is simply for ease of illustration, and multiple external devices may communicate with the node transceiver 120 via the I2C transceiver 129. As known in the art, the I2C protocol uses clock (SCL) and data (SDA) lines to provide data transfer. The I2C transceiver 129 may be in communication with the bus protocol circuitry 126 and pins for communication with the external device 157. Four pins, ADR1, ADR2, SDA, and SCL are illustrated in FIG. 2; ADR1 and ADR2 may be used to modify the I2C addresses used by the node transceiver 120 when the node transceiver 120 acts as an I2C slave (e.g., when it is included in the main node 102-1), and SDA and SCL are used for the I2C serial data and serial clock signals, respectively. When the node transceiver 120 is included in the main node 102-1, the external device 157 may include the host 110, and the I2C transceiver 129 may provide an I2C slave that can receive programming instructions from the host 110. In particular, an I2C serial clock signal may be received at the SCL pin as an input from the host 110 for register accesses. When the node transceiver 120 is included in a sub node 102-2, the external device 157 may include a peripheral device 108 and the I2C transceiver 129 may provide an I2C master to allow the I2C transceiver to program one or more peripheral devices in accordance with instructions provided by the host 110 and transmitted to the node transceiver 120 via the bus 106. In particular, the I2C transceiver 129 may provide the I2C serial clock signal at the SCL pin as an output.

The node transceiver 120 may include a transceiver 136 for SPI communication between the node transceiver 120 and an external device 138. Although the "external device 138" may be referred to in the singular herein, this is simply for ease of illustration, and multiple external devices may communicate with the node transceiver 120 via the SPI transceiver 136. As known in the art, the SPI protocol uses slave select (SS), clock (BCLK), master-out-slave-in (MOSI), and master-in-slave-out (MISO) data lines to provide data transfer, and pins corresponding to these four lines are illustrated in FIG. 2. The SPI transceiver 136 may be in communication with the bus protocol circuitry 126 and pins for communication with the external device 138. When the node transceiver 120 is included in the main node 102-1, the external device 138 may include the host 110 or another external device, and the SPI transceiver 136 may provide an SPI slave that can receive and respond to commands from the host 110 or other external device. When the node transceiver 120 is included in a sub node 102-2, the external device 138 may include a peripheral device 108 and the SPI transceiver 136 may provide an SPI host to allow the SPI transceiver 136 to send commands to one or more peripheral devices 108. The SPI transceiver 136 may include a read data first-in-first-out (FIFO) buffer and a write data FIFO buffer. The read data FIFO buffer may be used to collect data read from other nodes 102, and may be read by an external device 138 when the external device 138 transmits an appropriate read command. The write data FIFO buffer may be used to collect write data from the external device 138 before the write data is transmitted to another device.

The node transceiver 120 may include an interrupt request (IRQ) pin in communication with the bus protocol circuitry 126. When the node transceiver 120 is included in the main node 102-1, the bus protocol circuitry 126 may provide event-driven interrupt requests toward the host 110 via the IRQ pin. When the node transceiver 120 is included in a sub node 102-2 (e.g., when the MSTR pin is low), the IRQ pin may serve as a GPIO pin with interrupt request capability. The node transceiver 120 may include other pins in addition to those shown in FIG. 2 (e.g., as discussed below).

The system 100 may operate in any of a number of different operational modes. The nodes on the bus 106 may each have a register indicating which operational mode is currently enabled. Descriptions follow of examples of various operational modes that may be implemented. In a standby operational mode, bus activity is reduced to enable global power savings; the only traffic required is a minimal downstream preamble to keep the PLLs of each node (e.g., the PLL 128) synchronized. In standby operational mode, reads and writes across the bus 106 are not supported. In a discovery operational mode, the main node 102-1 may send predetermined signals out along the bus 106 and wait for suitable responses to map out the topology of sub nodes 102-2 distributed along the bus 106. In a normal operational mode, full register access may be available to and from the sub nodes 102-2 as well as access to and from peripheral devices 108 over the bus 106. Normal mode may be globally configured by the host 110 with or without synchronous upstream data and with or without synchronous downstream data.

Figure 3:
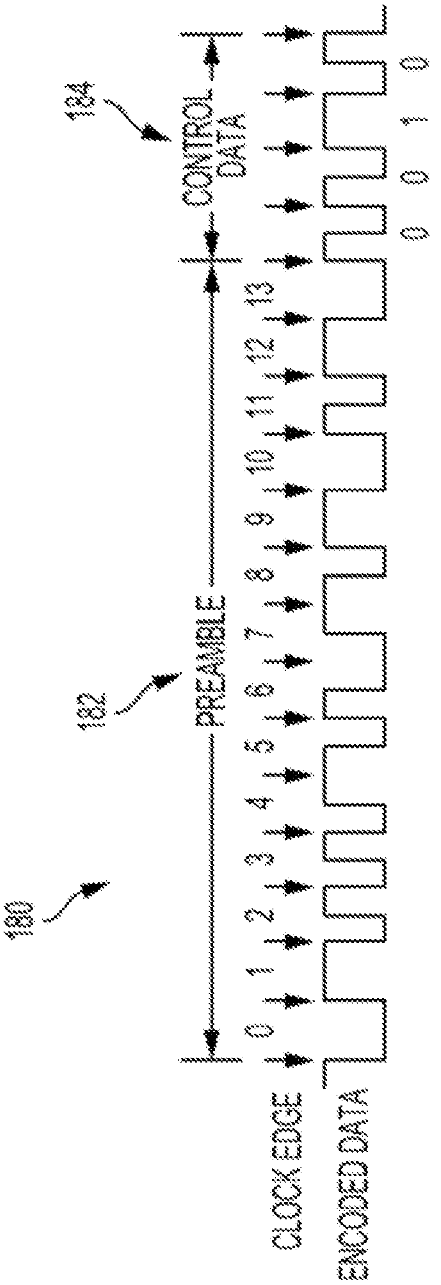
FIG. 3 is a diagram of a portion of a synchronization control frame used for communication in the system of FIG. 1, in accordance with various embodiments.

FIG. 3 is a diagram of a portion of a synchronization control frame 180 used for communication in the system 100, in accordance with various embodiments. In particular, the synchronization control frame 180 may be used for data clock recovery and PLL synchronization, as discussed below. As noted above, because communications over the bus 106 may occur in both directions, communications may be time-multiplexed into downstream portions and upstream portions. In a downstream portion, a synchronization control frame and downstream data may be transmitted from the main node 102-1, while in an upstream portion, a synchronization response frame, and upstream data may be transmitted to the main node 102-1 from each of the sub nodes 102-2. The synchronization control frame 180 may include a preamble 182 and control data 184. Each sub node 102-2 may be configured to use the preamble 182 of the received synchronization control frame 180 as a time base for feeding the PLL 128. To facilitate this, a preamble 182 does not follow the "rules" of valid control data 184, and thus can be readily distinguished from the control data 184.

Figure 5:
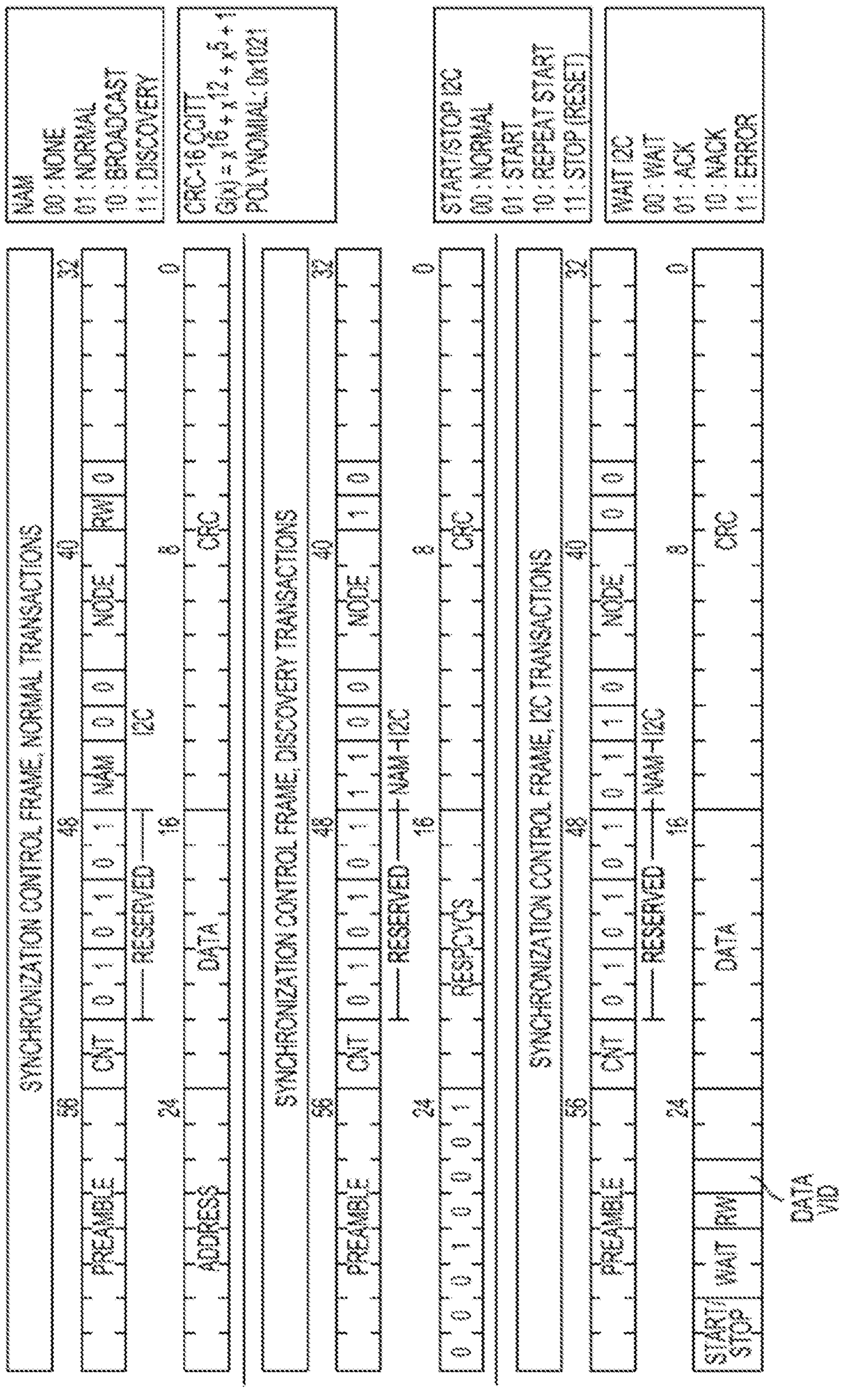
FIG. 5 illustrates example formats for a synchronization control frame in different modes of operation of the system of FIG. 1, in accordance with various embodiments.

For example, in some embodiments, communication along the bus 106 may be encoded using a clock first, transition on zero differential Manchester coding scheme. According to such an encoding scheme, each bit time begins with a clock transition. If the data value is zero, the encoded signal transitions again in the middle of the bit time. If the data value is one, the encoded signal does not transition again. The preamble 182 illustrated in FIG. 5 may violate the encoding protocol (e.g., by having clock transitions that do not occur at the beginning of bit times 5, 7, and 8), which means that the preamble 182 may not match any legal (e.g., correctly encoded) pattern for the control data 184. In addition, the preamble 182 cannot be reproduced by taking a legal pattern for the control data 184 and forcing the bus 106 high or low for a single bit time or for a multiple bit time period. The preamble 182 illustrated in FIG. 5 is simply illustrative, and the synchronization control frame 180 may include different preambles 182 that may violate the encoding used by the control data 184 in any suitable manner.

The bus protocol circuitry 126 may include differential Manchester decoder circuitry that runs on a clock recovered from the bus 106 and that detects the synchronization control frame 180 to send a frame sync indicator to the PLL 128. In this manner, the synchronization control frame 180 may be detected without using a system clock or a higher-speed oversampling clock. Consequently, the sub nodes 102-2 can receive a PLL synchronization signal from the bus 106 without requiring a crystal clock source at the sub nodes 102-2.

Figure 4:
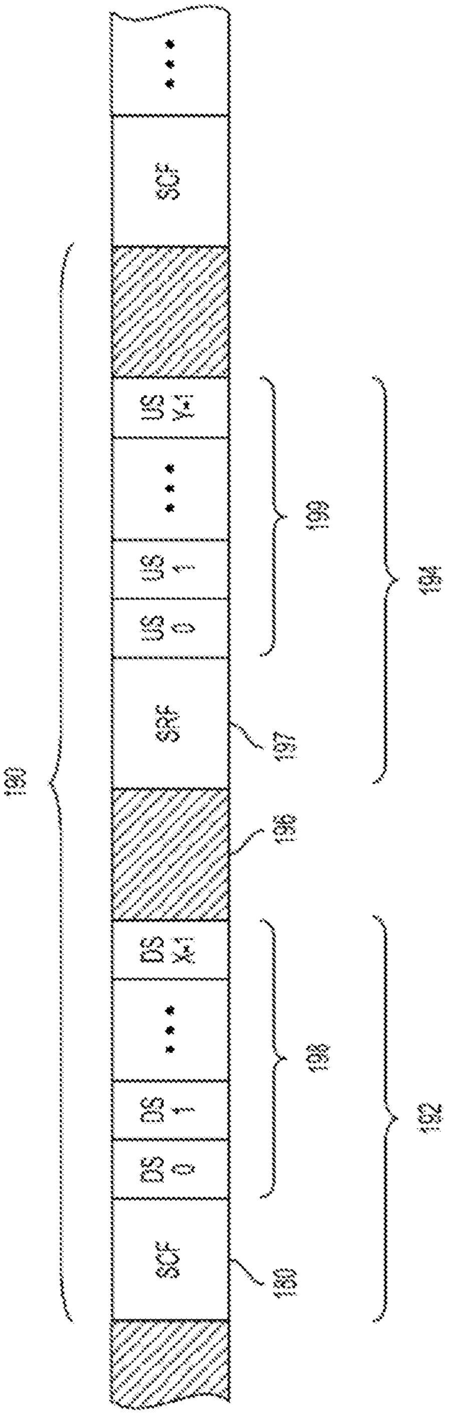
FIG. 4 is a diagram of a superframe used for communication in the system of FIG. 1, in accordance with various embodiments.
Figure 6:
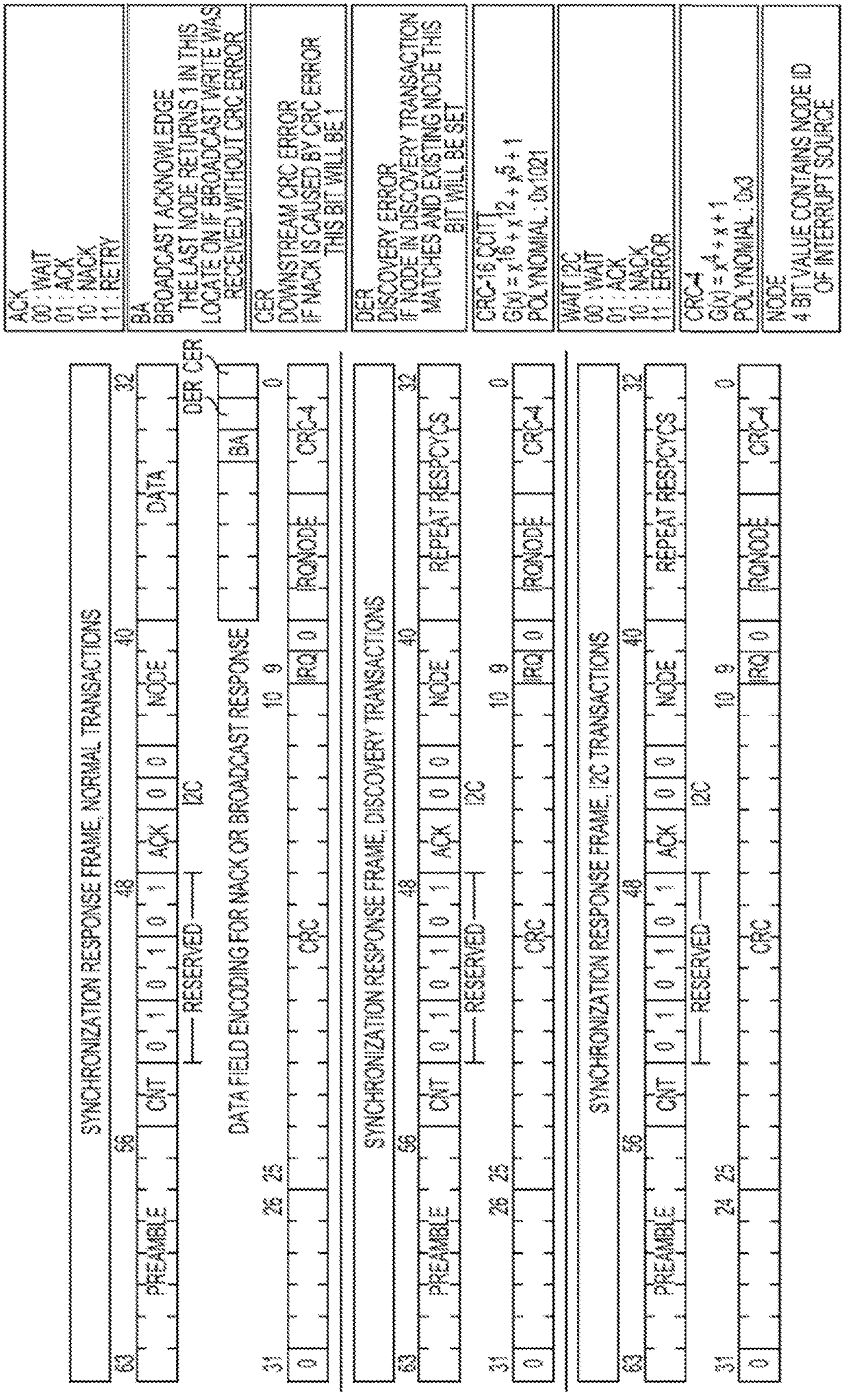
FIG. 6 illustrates example formats for a synchronization response frame at different modes of operation of the system of FIG. 1, in accordance with various embodiments.

As noted above, communications along the bus 106 may occur in periodic superframes. FIG. 4 is a diagram of a superframe 190, in accordance with various embodiments. As shown in FIG. 6, a superframe may begin with a synchronization control frame 180. When the synchronization control frame 180 is used as a timing source for the PLL 128, the frequency at which superframes are communicated ("the superframe frequency") may be the same as the synchronization signal frequency. In some embodiments in which audio data is transmitted along the bus 106, the superframe frequency may be the same as the audio sampling frequency used in the system 100 (e.g., either 48 kHz or 44.1 kHz), but any suitable superframe frequency may be used. Each superframe 190 may be divided into periods of downstream transmission 192, periods of upstream transmission 194, and periods of no transmission 196 (e.g., when the bus 106 is not driven).

In FIG. 4, the superframe 190 is shown with an initial period of downstream transmission 192 and a later period of upstream transmission 194. The period of downstream transmission 192 may include a synchronization control frame 180 and X downstream data slots 198, where X can be zero. Substantially all signals on the bus 106 may be line-coded and a synchronization signal forwarded downstream from the main node 102-1 to the last sub node 102-2 (e.g., the sub node 102-2C) in the form of the synchronization preamble 182 in the synchronization control frame 180, as discussed above. Downstream, TDM, synchronous data may be included in the X downstream data slots 198 after the synchronization control frame 180. The downstream data slots 198 may have equal width. As discussed above, the PLL 128 may provide the clock that a node uses to time communications over the bus 106. In some embodiments in which the bus 106 is used to transmit audio data, the PLL 128 may operate at a multiple of the audio sampling frequency (e.g., 1024 times the audio sampling frequency, resulting in 1024-bit clocks in each superframe).

The period of upstream transmission 194 may include a synchronization response frame 197 and Y upstream data slots 199, where Y can be zero. In some embodiments, each sub node 102-2 may consume a portion of the downstream data slots 198. The last sub node (e.g., sub node 2 in FIG. 1) may respond (after a predetermined response time stored in a register of the last sub node) with a synchronization response frame 197. Upstream, TDM, synchronous data may be added by each sub node 102-2 in the upstream data slots 199 directly after the synchronization response frame 197. The upstream data slots 199 may have equal width. A sub node 102-2 that is not the last sub node (e.g., the sub nodes 0 and 1 in FIG. 1) may replace the received synchronization response frame 197 with its own upstream response if a read of one of its registers was requested in the synchronization control frame 180 of the superframe 190 or if a remote I2C read was requested in the synchronization control frame 180 of the superframe 190.

As discussed above, the synchronization control frame 180 may begin each downstream transmission. In some embodiments, the synchronization control frame 180 may be 64 bits in length, but any other suitable length may be used. The synchronization control frame 180 may begin with the preamble 182, as noted above. In some embodiments, when the synchronization control frame 180 is retransmitted by a sub node 102-2 to a downstream sub node 102-2, the preamble 182 may be generated by the transmitting sub node 102-2, rather than being retransmitted.

The control data 184 of the synchronization control frame 180 may include fields that contain data used to control transactions over the bus 106. Examples of these fields are discussed below, and some embodiments are illustrated in FIG. 5. In particular, FIG. 5 illustrates example formats for the synchronization control frame 180 in normal mode, I2C mode, and discovery mode, in accordance with various embodiments. In some embodiments, a different preamble 182 or synchronization control frame 180 entirely may be used in standby mode so that the sub nodes 102-2 do not need to receive all of the synchronization control frame 180 until a transition to normal mode is sent.

In some embodiments, the synchronization control frame 180 may include a count (CNT) field. The CNT field may have any suitable length (e.g., 2 bits) and may be incremented (modulo the length of the field) from the value used in the previous superframe. A sub node 102-2 that receives a CNT value that is unexpected may be programmed to return an interrupt.

In some embodiments, the synchronization control frame 180 may include a node addressing mode (NAM) field. The NAM field may have any suitable length (e.g., 2 bits) and may be used to control access to registers of a sub node 102-2 over the bus 106. In normal mode, registers of a sub node 102-2 may be read from and/or written to based on the ID of the sub node 102-2 and the address of the register. Broadcast transactions are writes which should be taken by every sub node 102-2. In some embodiments, the NAM field may provide for four node addressing modes, including "none" (e.g., data not addressed to any particular sub node 102-2), "normal" (e.g., data unicast to a specific sub node 102-2 specified in the address field discussed below), "broadcast" (e.g., addressed to all sub nodes 102-2), and "discovery."

In some embodiments, the synchronization control frame 180 may include an I2C field. The I2C field may have any suitable length (e.g., 1 bit) and may be used to indicate that the period of downstream transmission 192 includes an I2C transaction. The I2C field may indicate that the host 110 has provided instructions to remotely access a peripheral device 108 that acts as an I2C slave with respect to an associated sub node 102-2.

In some embodiments, the synchronization control frame 180 may include a node field. The node field may have any suitable length (e.g., 4 bits) and may be used to indicate which sub node is being addressed for normal and I2C accesses. In discovery mode, this field may be used to program an identifier for a newly discovered sub node 102-2 in a node ID register of the sub node 102-2. Each sub node 102-2 in the system 100 may be assigned a unique ID when the sub node 102-2 is discovered by the main node 102-1, as discussed below. In some embodiments, the main node 102-1 does not have a node ID, while in other embodiments, the main node 102-1 may have a node ID. In some embodiments, the sub node 102-2 attached to the main node 102-1 on the bus 106 (e.g., the sub node 0 in FIG. 1) will be sub node 0, and each successive sub node 102-2 will have a number that is 1 higher than the previous sub node. However, this is simply illustrative, and any suitable sub node identification system may be used.

In some embodiments, the synchronization control frame 180 may include a read/write (RW) field. The RW field may have any suitable length (e.g., 1 bit) and may be used to control whether normal accesses are reads (e.g., RW==1) or writes (e.g., RW==0).

In some embodiments, the synchronization control frame 180 may include an address field. The address field may have any suitable length (e.g., 8 bits) and may be used to address specific registers of a sub node 102-2 through the bus 106. For I2C transactions, the address field may be replaced with I2C control values, such as START/STOP, WAIT, RW, and DATA VLD. For discovery transactions, the address field may have a predetermined value (e.g., as illustrated in FIG. 5).

In some embodiments, the synchronization control frame 180 may include a data field. The data field may have any suitable length (e.g., 8 bits) and may be used for normal, I2C, and broadcast writes. The RESPCYCS value, multiplied by 4, may be used to determine how many cycles a newly discovered node should allow to elapse between the start of the synchronization control frame 180 being received and the start of the synchronization response frame 197 being transmitted. When the NAM field indicates discovery mode, the node address and data fields discussed below may be encoded as a RESPCYCS value that, when multiplied by a suitable optional multiplier (e.g., 4), indicates the time, in bits, from the end of the synchronization control frame 180 to the start of the synchronization response frame 197. This allows a newly discovered sub node 102-2 to determine the appropriate time slot for upstream transmission.

In some embodiments, the synchronization control frame 180 may include a cyclic redundancy check (CRC) field. The CRC field may have any suitable length (e.g., 16 bits) and may be used to transmit a CRC value for the control data 184 of the synchronization control frame 180 following the preamble 182. In some embodiments, the CRC may be calculated in accordance with the CCITT-CRC error detection scheme.

In some embodiments, at least a portion of the synchronization control frame 180 between the preamble 182 and the CRC field may be scrambled in order to reduce the likelihood that a sequence of bits in this interval will periodically match the preamble 182 (and thus may be misinterpreted by the sub node 102-2 as the start of a new superframe 190), as well as to reduce electromagnetic emissions as noted above. In some such embodiments, the CNT field of the synchronization control frame 180 may be used by scrambling logic to ensure that the scrambled fields are scrambled differently from one superframe to the next. Various embodiments of the system 100 described herein may omit scrambling.

Other techniques may be used to ensure that the preamble 182 can be uniquely identified by the sub nodes 102-2 or to reduce the likelihood that the preamble 182 shows up elsewhere in the synchronization control frame 180, in addition to or in lieu of techniques such as scrambling and/or error encoding as discussed above. For example, a longer synchronization sequence may be used so as to reduce the likelihood that a particular encoding of the remainder of the synchronization control frame 180 will match it. Additionally or alternatively, the remainder of the synchronization control frame may be structured so that the synchronization sequence cannot occur, such as by placing fixed "0" or "1" values at appropriate bits.

The main node 102-1 may send read and write requests to the sub nodes 102-2, including both requests specific to communication on the bus 106 and I2C requests. For example, the main node 102-1 may send read and write requests (indicated using the RW field) to one or more designated sub nodes 102-2 (using the NAM and node fields) and can indicate whether the request is a request for the sub node 102-2 specific to the bus 106, an I2C request for the sub node 102-2, or an I2C request to be passed along to an I2C-compatible peripheral device 108 coupled to the sub node 102-2 at one or more I2C ports of the sub node 102-2.

Turning to upstream communication, the synchronization response frame 197 may begin each upstream transmission. In some embodiments, the synchronization response frame 197 may be 64 bits in length, but any other suitable length may be used. The synchronization response frame 197 may also include a preamble, as discussed above with reference to the preamble 182 of the synchronization control frame 180, followed by data portion. At the end of a downstream transmission, the last sub node 102-2 on the bus 106 may wait until the RESPCYCS counter has expired and then begin transmitting a synchronization response frame 197 upstream. If an upstream sub node 102-2 has been targeted by a normal read or write transaction, a sub node 102-2 may generate its own synchronization response frame 197 and replace the one received from downstream. If any sub node 102-2 does not see a synchronization response frame 197 from a downstream sub node 102-2 at the expected time, the sub node 102-2 will generate its own synchronization response frame 197 and begin transmitting it upstream.

The data portion of the synchronization response frame 197 may include fields that contain data used to communicate response information back to the main node 102-1. Examples of these fields are discussed below, and some embodiments are illustrated in FIG. 6. In particular, FIG. 6 illustrates example formats for the synchronization response frame 197 in normal mode, I2C mode, and discovery mode, in accordance with various embodiments.

In some embodiments, the synchronization response frame 197 may include a count (CNT) field. The CNT field may have any suitable length (e.g., 2 bits) and may be used to transmit the value of the CNT field in the previously received synchronization control frame 180.

In some embodiments, the synchronization response frame 197 may include an acknowledge (ACK) field. The ACK field may have any suitable length (e.g., 2 bits), and may be inserted by a sub node 102-2 to acknowledge a command received in the previous synchronization control frame 180 when that sub node 102-2 generates the synchronization response frame 197. Example indicators that may be communicated in the ACK field include wait, acknowledge, not acknowledge (NACK), and retry. In some embodiments, the ACK field may be sized to transmit an acknowledgment by a sub node 102-2 that it has received and processed a broadcast message (e.g., by transmitting a broadcast acknowledgment to the main node 102-1). In some such embodiments, a sub node 102-2 also may indicate whether the sub node 102-2 has data to transmit (which could be used, for example, for demand-based upstream transmissions, such as non-TDM inputs from a keypad or touchscreen, or for prioritized upstream transmission, such as when the sub node 102-2 wishes to report an error or emergency condition).

In some embodiments, the synchronization response frame 197 may include an I2C field. The I2C field may have any suitable length (e.g., 1 bit) and may be used to transmit the value of the I2C field in the previously received synchronization control frame 180.

In some embodiments, the synchronization response frame 197 may include a node field. The node field may have any suitable length (e.g., 4 bits) and may be used to transmit the ID of the sub node 102-2 that generates the synchronization response frame 197.

In some embodiments, the synchronization response frame 197 may include a data field. The data field may have any suitable length (e.g., 8 bits), and its value may depend on the type of transaction and the ACK response of the sub node 102-2 that generates the synchronization response frame 197. For discovery transactions, the data field may include the value of the RESPCYCS field in the previously received synchronization control frame 180. When the ACK field indicates a NACK, or when the synchronization response frame 197 is responding to a broadcast transaction, the data field may include a broadcast acknowledge (BA) indicator (in which the last sub node 102-2 may indicate if the broadcast write was received without error), a discovery error (DER) indicator (indicating whether a newly discovered sub node 102-2 in a discovery transaction matches an existing sub node 102-2), and a CRC error (CER) indicator (indicating whether a NACK was caused by a CRC error).

In some embodiments, the synchronization response frame 197 may include a CRC field. The CRC field may have any suitable length (e.g., 16 bits) and may be used to transmit a CRC value for the portion of the synchronization response frame 197 between the preamble and the CRC field.

In some embodiments, the synchronization response frame 197 may include an interrupt request (IRQ) field. The IRQ field may have any suitable length (e.g., 1 bit) and may be used to indicate that an interrupt has been signaled from a sub node 102-2.

In some embodiments, the synchronization response frame 197 may include an IRQ node (IRQNODE) field. The IRQNODE field may have any suitable length (e.g., 4 bits) and may be used to transmit the ID of the sub node 102-2 that has signaled the interrupt presented by the IRQ field. In some embodiments, the sub node 102-2 for generating the IRQ field will insert its own ID into the IRQNODE field.

In some embodiments, the synchronization response frame 197 may include a second CRC (CRC-4) field. The CRC-4 field may have any suitable length (e.g., 4 bits) and may be used to transmit a CRC value for the IRQ and IRQNODE fields.

In some embodiments, the synchronization response frame 197 may include an IRQ field, an IRQNODE field, and a CRC-4 field as the last bits of the synchronization response frame 197 (e.g., the last 10 bits). As discussed above, these interrupt-related fields may have their own CRC protection in the form of CRC-4 (and thus not protected by the preceding CRC field). Any sub node 102-2 that needs to signal an interrupt to the main node 102-1 will insert its interrupt information into these fields. In some embodiments, a sub node 102-2 with an interrupt pending may have higher priority than any sub node 102-2 further downstream that also has an interrupt pending. The last sub node 102-2 along the bus 106 (e.g., the sub node 2 in FIG. 1) may always populate these interrupt fields. If the last sub node 102-2 has no interrupt pending, the last sub node 102-2 may set the IRQ bit to 0, the IRQNODE field to its node ID, and provide the correct CRC-4 value. For convenience, a synchronization response frame 197 that conveys an interrupt may be referred to herein as an "interrupt frame."

In some embodiments, at least a portion of the synchronization response frame 197 between the preamble 182 and the CRC field may be scrambled in order to reduce emissions. In some such embodiments, the CNT field of the synchronization response frame 197 may be used by scrambling logic to ensure that the scrambled fields are scrambled differently from one superframe to the next. Various embodiments of the system 100 described herein may omit scrambling.

Other techniques may be used to ensure that the preamble 182 can be uniquely identified by the sub nodes 102-2 or to reduce the likelihood that the preamble 182 shows up elsewhere in the synchronization response frame 197, in addition to or in lieu of techniques such as scrambling and/or error encoding as discussed above. For example, a longer synchronization sequence may be used so as to reduce the likelihood that a particular encoding of the remainder of the synchronization response frame 197 will match it. Additionally or alternatively, the remainder of the synchronization response frame may be structured so that the synchronization sequence cannot occur, such as by placing fixed "0" or "1" values at appropriate bits.

Figure 7:
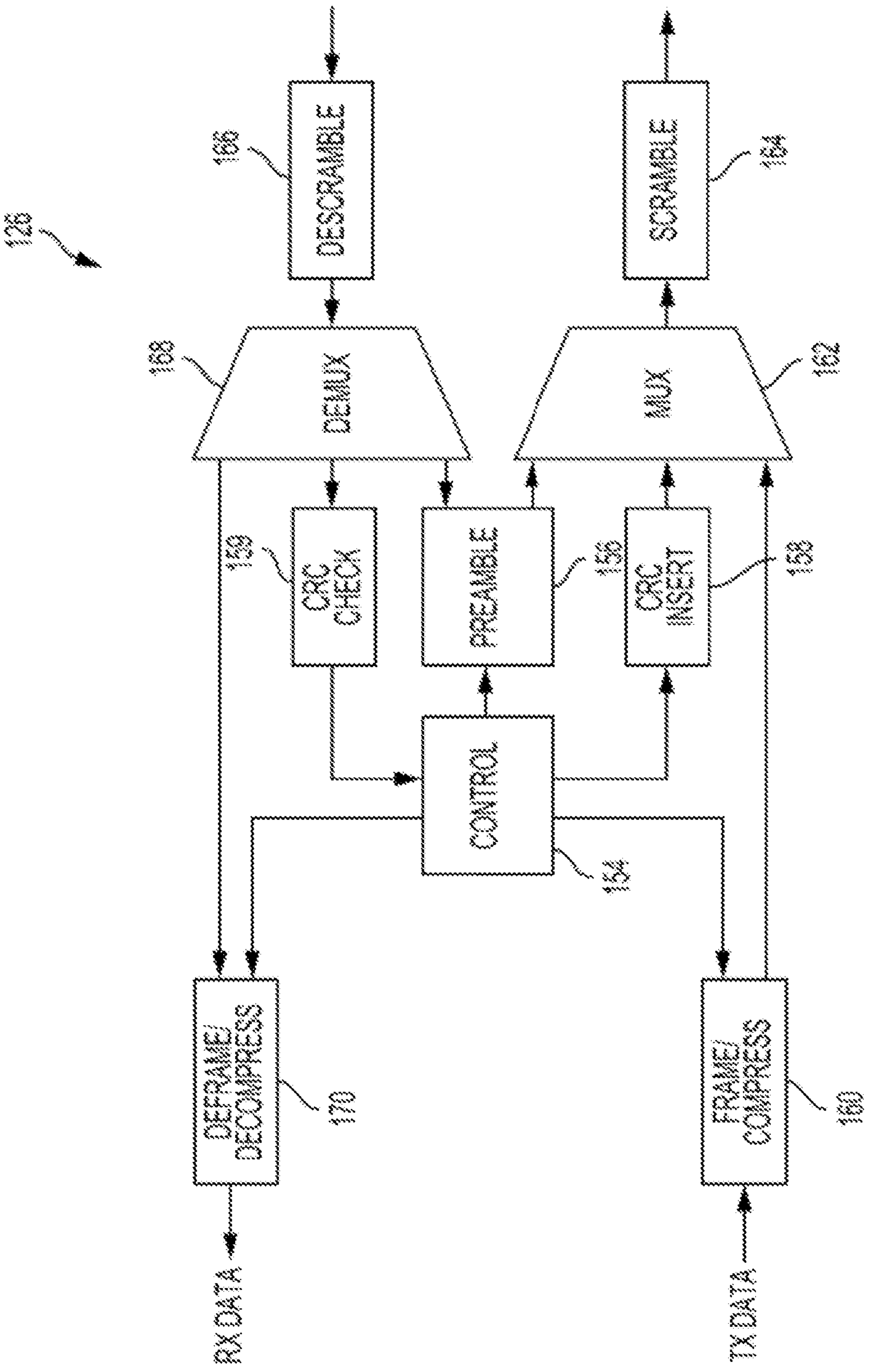
FIG. 7 is a block diagram of various components of the bus protocol circuitry of FIG. 2, in accordance with various embodiments.

FIG. 7 is a block diagram of the bus protocol circuitry 126 of FIG. 2, in accordance with various embodiments. The bus protocol circuitry 126 may include control circuitry 154 to control the operation of the node transceiver 120 in accordance with the protocol for the bus 106 described herein. In particular, the control circuitry 154 may control the generation of synchronization frames for transmission (e.g., synchronization control frames or synchronization response frames, as discussed above), the processing of received synchronization frames, and the performance of control operations specified in received synchronization control frames. The control circuitry 154 may include programmable registers, as discussed below. The control circuitry 154 may create and receive synchronization control frames, react appropriately to received messages (e.g., associated with a synchronization control frame when the bus protocol circuitry 126 is included in a sub node 102-2 or from an I2C device when the bus protocol circuitry 126 is included in a main node 102-1), and adjust the framing to the different operational modes (e.g., normal, discovery, standby, etc.).

When the node transceiver 120 is preparing data for transmission along the bus 106, preamble circuitry 156 may be configured to generate preambles for synchronization frames for transmission, and to receive preambles from received synchronization frames. In some embodiments, a downstream synchronization control frame preamble may be sent by the main node 102-1 every 1024 bits. As discussed above, one or more sub nodes 102-2 may synchronize to the downstream synchronization control frame preamble and generate local, phase-aligned main clocks from the preamble.

CRC insert circuitry 158 may be configured to generate one or more CRCs for synchronization frames for transmission. Frame/compress circuitry 160 may be configured to take incoming data from the I2S/TDM/PDM transceiver 127 (e.g., from a frame buffer associated with the transceiver 127), the I2C transceiver 129, and/or the SPI transceiver 136, optionally compress the data, and optionally generate parity check bits or error correction codes (ECC) for the data. A multiplexer (MUX) 162 may multiplex a preamble from the preamble circuitry 156, synchronization frames, and data into a stream for transmission. In some embodiments, the transmit stream may be scrambled by scrambling circuitry 164 before transmission.

For example, in some embodiments, the frame/compress circuitry 160 may apply a floating point compression scheme. In such an embodiment, the control circuitry 154 may transmit 3 bits to indicate how many repeated sign bits are in the number, followed by a sign bit and N-4 bits of data, where N is the size of the data to be transmitted over the bus 106. The use of data compression may be configured by the main node 102-1 when desired.

In some embodiments, the receive stream entering the node transceiver 120 may be descrambled by the descrambling circuitry 166. A demultiplexer (DEMUX) 168 may demultiplex the preamble, synchronization frames, and data from the receive stream. CRC check circuitry 159 on the receive side may check received synchronization frames for the correct CRC. When the CRC check circuitry 159 identifies a CRC failure in an incoming synchronization control frame 180, the control circuitry 154 may be notified of the failure and will not perform any control commands in the control data 184 of the synchronization control frame 180. When the CRC check circuitry 159 identifies a CRC failure in an incoming synchronization response frame 197, the control circuitry 154 may be notified of the failure and may generate an interrupt for transmission to the host 110 in an interrupt frame. Deframe/decompress circuitry 170 may accept receive data, optionally check its parity, optionally perform error detection and correction (e.g., single error correction—double error detection (SECDED)), optionally decompress the data, and may write the receive data to the I2S/TDM/PDM transceiver 127 (e.g., a frame buffer associated with the transceiver 127), the I2C transceiver 129, and/or the SPI transceiver 136.

As discussed above, upstream and downstream data may be transmitted along the bus 106 in TDM data slots within a superframe 190. The control circuitry 154 may include registers dedicated to managing these data slots on the bus 106, a number of examples of which are discussed below. When the control circuitry 154 is included in a main node 102-1, the values in these registers may be programmed into the control circuitry 154 by the host 110. When the control circuitry 154 is included in a sub node 102-2, the values in these registers may be programmed into the control circuitry 154 by the main node 102-1.

In some embodiments, the control circuitry 154 may include a downstream slots (DNSLOTS) register. When the node transceiver 120 is included in the main node 102-1, this register may hold the value of the total number of downstream data slots. This register may also define the number of data slots that will be used for combined I2S/TDM/PDM receive by the I2S/TDM/PDM transceiver 127 in the main node 102-1. In a sub node 102-2, this register may define the number of data slots that are passed downstream to the next sub node 102-2 before or after the addition of locally generated downstream slots, as discussed in further detail below with reference to LDNSLOTS.

In some embodiments, the control circuitry 154 may include a local downstream slots (LDNSLOTS) register. This register may be unused in the main node 102-1. In a sub node 102-2, this register may define the number of data slots that the sub node 102-2 will use and not retransmit. Alternatively, this register may define the number of slots that the sub node 102-2 may contribute to the downstream link of the bus 106.

In some embodiments, the control circuitry 154 may include an upstream slots (UPSLOTS) register. In the main node 102-1, this register may hold the value of the total number of upstream data slots. This register may also define the number of slots that will be used for I2S/TDM transmit by the I2S/TDM/PDM transceiver 127 in the main node 102-1. In a sub node 102-2, this register may define the number of data slots that are passed upstream before the sub node 102-2 begins to add its own data.

In some embodiments, the control circuitry 154 may include a local upstream slots (LUPSLOTS) register. This register may be unused in the main node 102-1. In a sub node 102-2, this register may define the number of data slots that the sub node 102-2 will add to the data received from downstream before it is sent upstream. This register may also define the number of data slots that will be used for combined I2S/TDM/PDM receive by the I2S/TDM/PDM transceiver 127 in the sub node 102-2.

In some embodiments, the control circuitry 154 may include a broadcast downstream slots (BCDNSLOTS) register. This register may be unused in the main node 102-1. In a sub node 102-2, this register may define the number of broadcast data slots. In some embodiments, broadcast data slots may always come at the beginning of the data field. The data in the broadcast data slots may be used by multiple sub nodes 102-2 and may be passed downstream by all sub nodes 102-2 whether or not they are used.

In some embodiments, the control circuitry 154 may include a slot format (SLOTFMT) register. This register may define the format of data for upstream and downstream transmissions. The data size for the I2S/TDM/PDM transceiver 127 may also be determined by this register. In some embodiments, valid data sizes include 8, 12, 16, 20, 24, 28, and 32 bits. This register may also include bits to enable floating point compression for downstream and upstream traffic. When floating point compression is enabled, the I2S/TDM data size may be 4 bits larger than the data size over the bus 106. All nodes in the system 100 may have the same values for SLOTFMT when data slots are enabled, and the nodes may be programmed by a broadcast write so that all nodes will be updated with the same value.

FIGS. 8-11 illustrate examples of information exchange along the bus 106, in accordance with various embodiments of the bus protocols described herein. In particular, FIGS. 8-11 illustrate embodiments in which each sub node 102-2 is coupled to one or more speakers and/or one or more microphones as the peripheral device 108. This is simply illustrative, as any desired arrangement of peripheral device 108 may be coupled to any particular sub node 102-2 in accordance with the techniques described herein.

Figure 8:
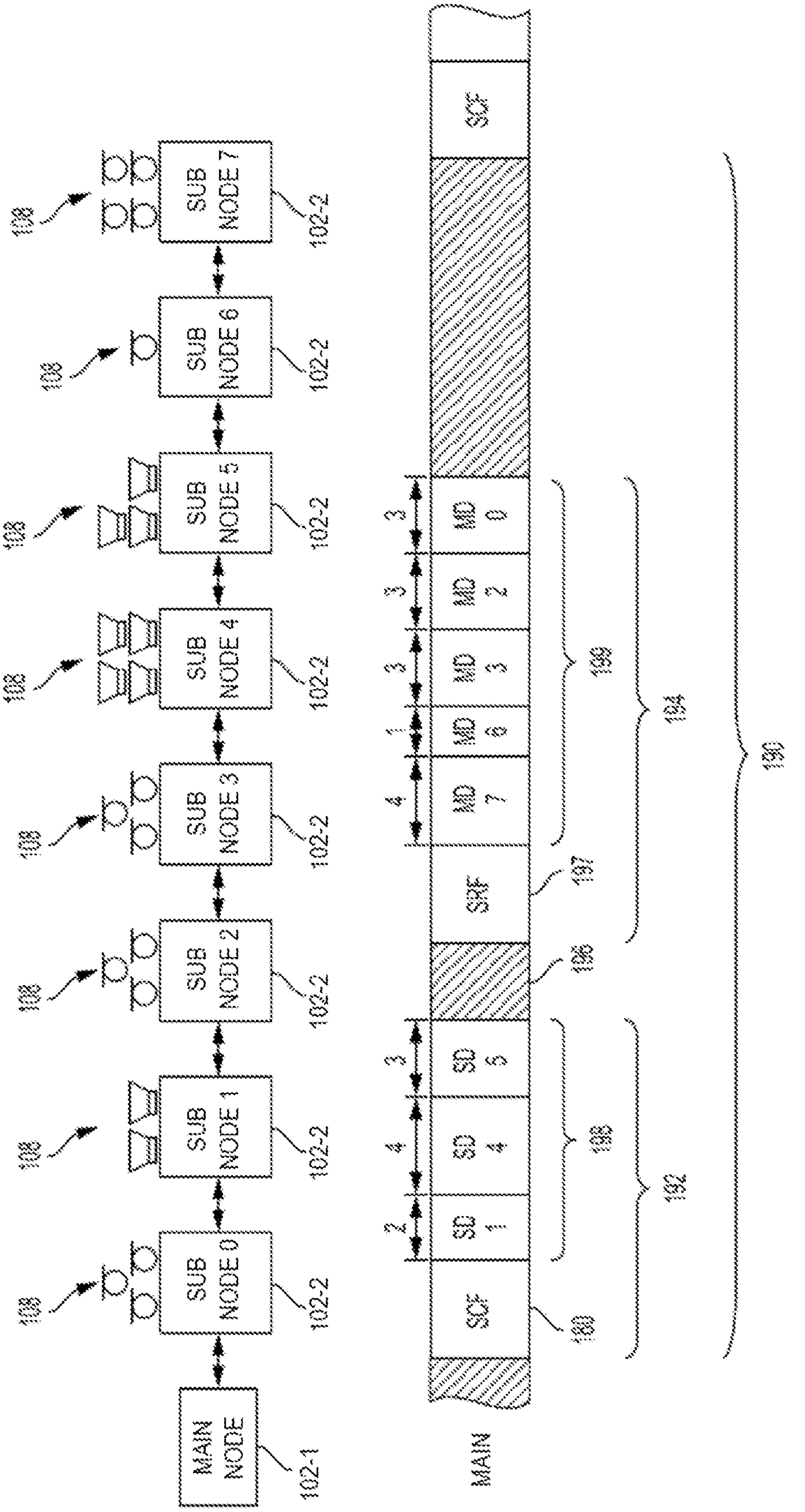
FIGS. 8-11 illustrate examples of information exchange along a two-wire bus, in accordance with various embodiments of the bus protocols described herein.

To begin, FIG. 8 illustrates signaling and timing considerations for bi-directional communication on the bus 106, in accordance with various embodiments. The sub nodes 102-2 depicted in FIG. 8 have various numbers of sensor/actuator elements, and so different amounts of data may be sent to, or received from, the various sub nodes 102-2. Specifically, sub node 1 has two elements, sub node 4 has four elements, and sub node 5 has three elements, so the data transmitted by the main node 102-1 includes two time slots for sub node 1, four time slots for sub node 4, and three time slots for sub node 5. Similarly, sub node 0 has three elements, sub node 2 has three elements, sub node 3 has three elements, sub node 6 has one element, and sub node 7 has four elements, so the data transmitted upstream by those sub nodes 102-2 includes the corresponding number of time slots. It should be noted that there need not have to be a one-to-one correlation between elements and time slots. For example, a microphone array, included in the peripheral device 108, having three microphones may include a DSP that combines signals from the three microphones (and possibly also information received from the main node 102-1 or from other sub nodes 102-2) to produce a single data sample, which, depending on the type of processing, could correspond to a single time slot or multiple time slots.

In FIG. 8, the main node 102-1 transmits an SCF followed by data for speakers coupled to specific sub nodes 102-2 (SD). Each successive sub node 102-2 forwards the SCF and also forwards at least any data destined for downstream sub nodes 102-2. A particular sub node 102-2 may forward all data or may remove data destined for that sub node 102-2. When the last sub node 102-2 receives the SCF, that sub node 102-2 transmits the SRF optionally followed by any data that the sub node 102-2 is permitted to transmit. Each successive sub node 102-2 forwards the SRF along with any data from downstream sub nodes 102-2 and optionally inserts data from one or more microphones coupled to the particular sub nodes 102-2 (MD). In the example of FIG. 8, the main node 102-1 sends data to sub nodes 1, 4, and 5 (depicted in FIG. 8 as active speakers) and receives data from sub nodes 7, 6, 3, 2, and 0 (depicted in FIG. 8 as microphone arrays).

Figure 9:
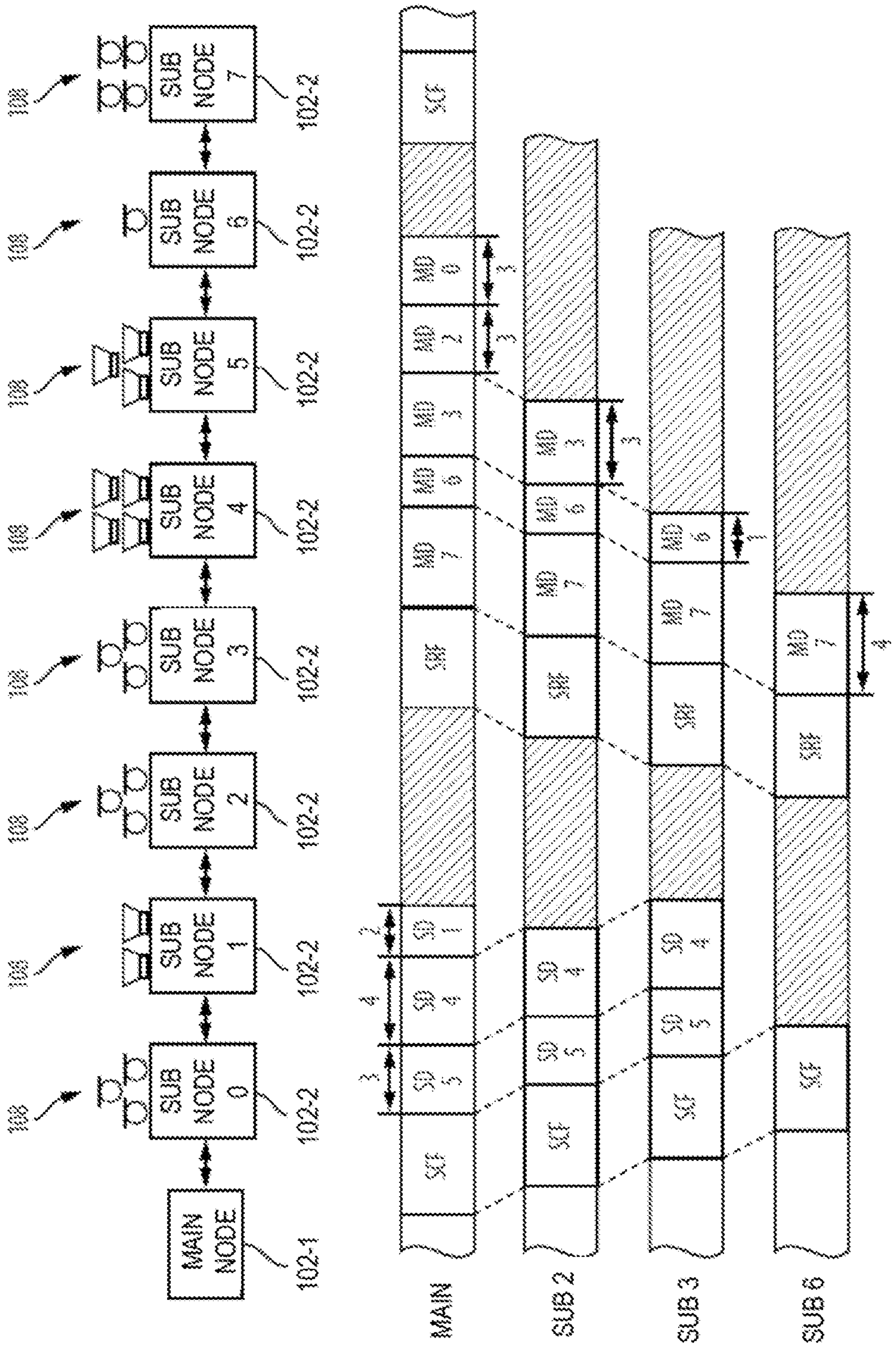

FIG. 9 schematically illustrates the dynamic removal of data from a downstream transmission and insertion of data into an upstream transmission, from the perspective of the downstream DS transceiver 124, in accordance with various embodiments. In FIG. 9, as in FIG. 8, the main node 102-1 transmits a SCF followed by data for sub nodes 1, 4, and 5 (SD) in reverse order (e.g., data for sub node 5 is followed by data for sub node 4, which is followed by data for sub node 1, etc.) (see the row labeled MAIN). When sub node 1 receives this transmission, sub node 1 removes its own data and forwards to sub node 2 only the SCF followed by the data for sub nodes 5 and 4. Sub nodes 2 and 3 forward the data unchanged (see the row labeled SUB 2), such that the data forwarded by sub node 1 is received by sub node 4 (see the row labeled SUB 3). Sub node 4 removes its own data and forwards to sub node 5 only the SCF followed by the data for sub node 5, and, similarly, sub node 5 removes its own data and forwards to sub node 6 only the SCF. Sub node 6 forwards the SCF to sub node 7 (see the row labeled SUB 6).

At this point, sub node 7 transmits to sub node 6 the SRF followed by its data (see the row labeled SUB 6). Sub node 6 forwards to sub node 5 the SRF along with the data from sub node 7 and its own data, and sub node 5 in turn forwards to sub node 4 the SRF along with the data from sub nodes 7 and 6. Sub node 4 has no data to add, so it simply forwards the data to sub node 3 (see the row labeled SUB 3), which forwards the data along with its own data to sub node 2 (see the row labeled SUB 2), which in turn forwards the data along with its own data to sub node 1. Sub node 1 has no data to add, so it forwards the data to sub node 0, which forwards the data along with its own data. As a result, the main node 102-1 receives the SRF followed by the data from sub nodes 7, 6, 3, 2, and 0 (see the row labeled MAIN).

Figure 10:
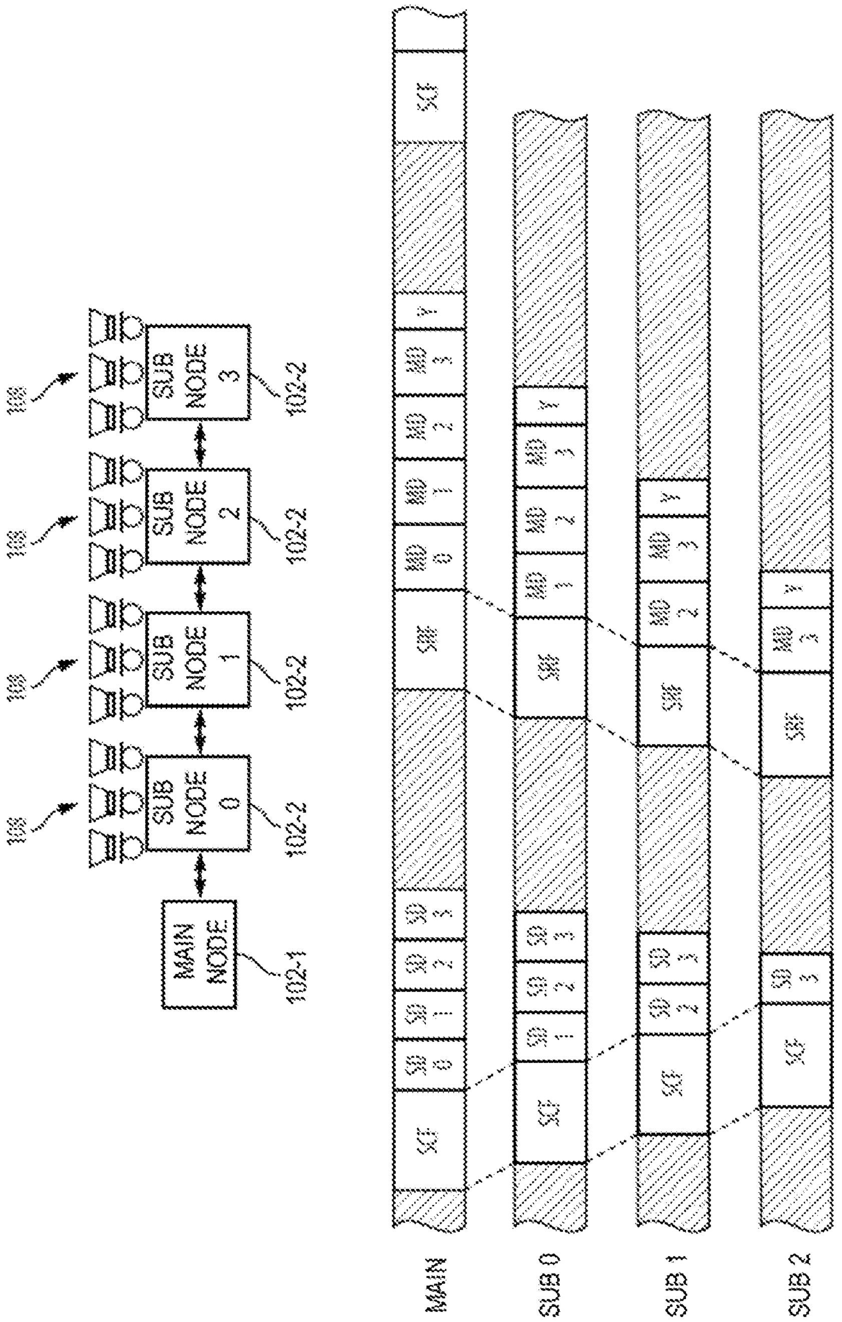

FIG. 10 illustrates another example of the dynamic removal of data from a downstream transmission and insertion of data into an upstream transmission, from the perspective of the downstream DS transceiver 124, as in FIG. 9, although in FIG. 10, the sub nodes 102-2 are coupled with both sensors and actuators as the peripheral device 108 such that the main node 102-1 sends data downstream to all of the sub nodes 102-2 and receives data back from all of the sub nodes 102-2. Also, in FIG. 10, the data is ordered based on the node address to which it is destined or from which it originates. The data slot labeled "Y" may be used for a data integrity check or data correction.

Figure 11:
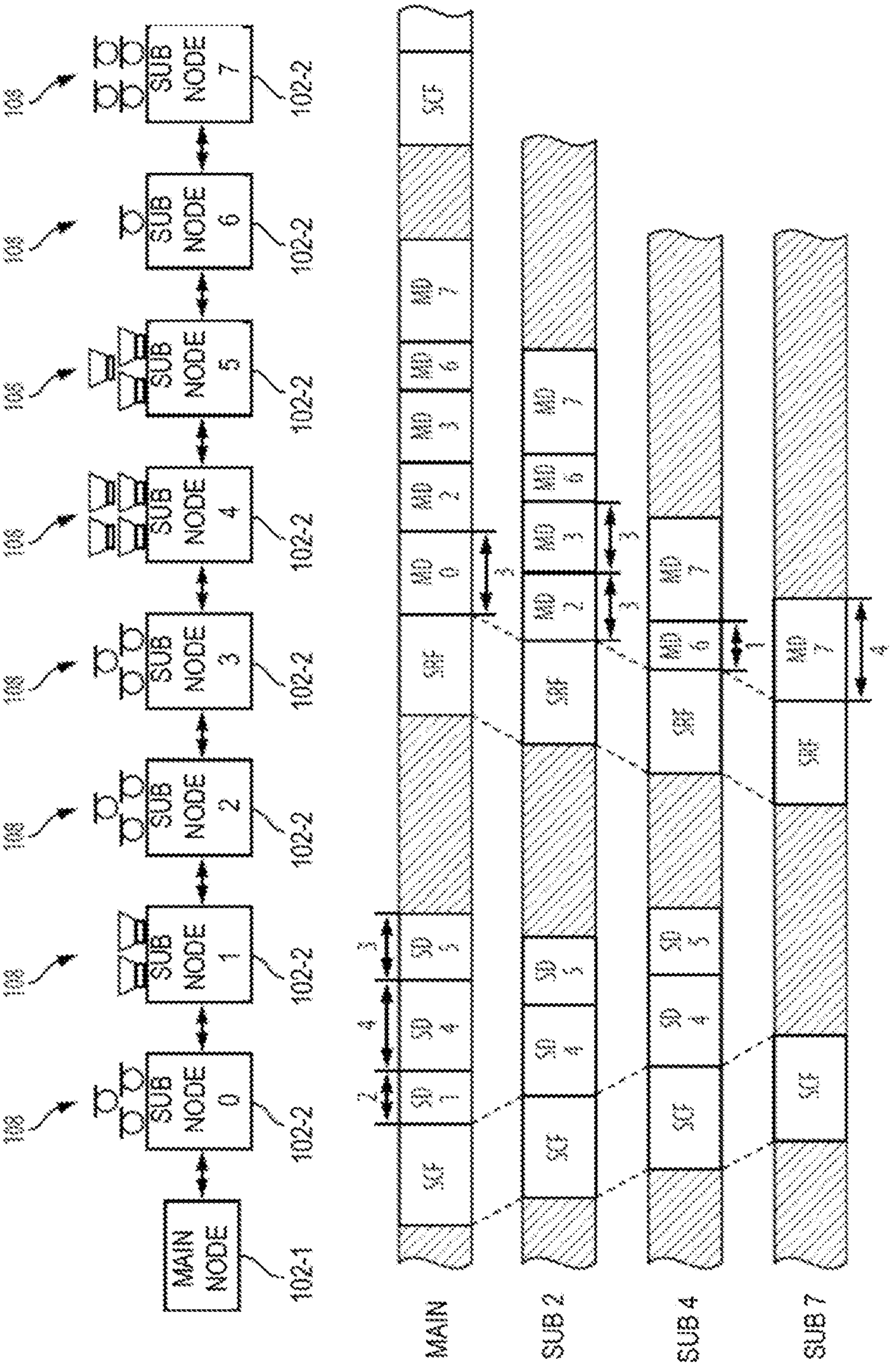

FIG. 11 illustrates another example of the dynamic removal of data from a downstream transmission and insertion of data into an upstream transmission, from the perspective of the downstream DS transceiver 124, as in FIG. 9, although in FIG. 11, the data is conveyed downstream and upstream in sequential order rather than reverse order. Buffering at each sub node 102-2 allows for selectively adding, removing, and/or forwarding data.

As discussed above, each sub node 102-2 may remove data from downstream or upstream transmissions and/or may add data to downstream or upstream transmissions. Thus, for example, the main node 102-1 may transmit a separate sample of data to each of a number of sub nodes 102-2, and each such sub node 102-2 may remove its data sample and forward only data intended for downstream sub nodes 102-2. On the other hand, a sub node 102-2 may receive data from a downstream sub node 102-2 and forward the data along with additional data. One advantage of transmitting as little information as needed is to reduce the amount of power consumed collectively by the system 100.

The system 100 may also support broadcast transmissions (and multicast transmissions) from the main node 102-1 to the sub nodes 102-2, specifically through configuration of the downstream slot usage of the sub nodes 102-2. Each sub node 102-2 may process the broadcast transmission and pass it along to the next sub node 102-2, although a particular sub node 102-2 may "consume" the broadcast message, (i.e., not pass the broadcast transmission along to the next sub node 102-2).

The system 100 may also support upstream transmissions (e.g., from a particular sub node 102-2 to one or more other sub nodes 102-2). Such upstream transmissions can include unicast, multicast, and/or broadcast upstream transmissions. With upstream addressing, as discussed above with reference to downstream transmissions, a sub node 102-2 may determine whether or not to remove data from an upstream transmission and/or whether or not to pass an upstream transmission along to the next upstream sub node 102-2 based on configuration of the upstream slot usage of the sub nodes 102-2. Thus, for example, data may be passed by a particular sub node 102-2 to one or more other sub nodes 102-2 in addition to, or in lieu of, passing the data to the main node 102-1. Such sub-sub relationships may be configured, for example, via the main node 102-1.

Thus, in various embodiments, the sub nodes 102-2 may operate as active/intelligent repeater nodes, with the ability to selectively forward, drop, and add information. The sub nodes 102-2 may generally perform such functions without necessarily decoding/examining all of the data, since each sub node 102-2 knows the relevant time slot(s) within which it will receive/transmit data, and hence can remove data from or add data into a time slot. Notwithstanding that the sub nodes 102-2 may not need to decode/examine all data, the sub nodes 102-2 may typically re-clock the data that it transmits/forwards. This may improve the robustness of the system 100.

Figure 12:
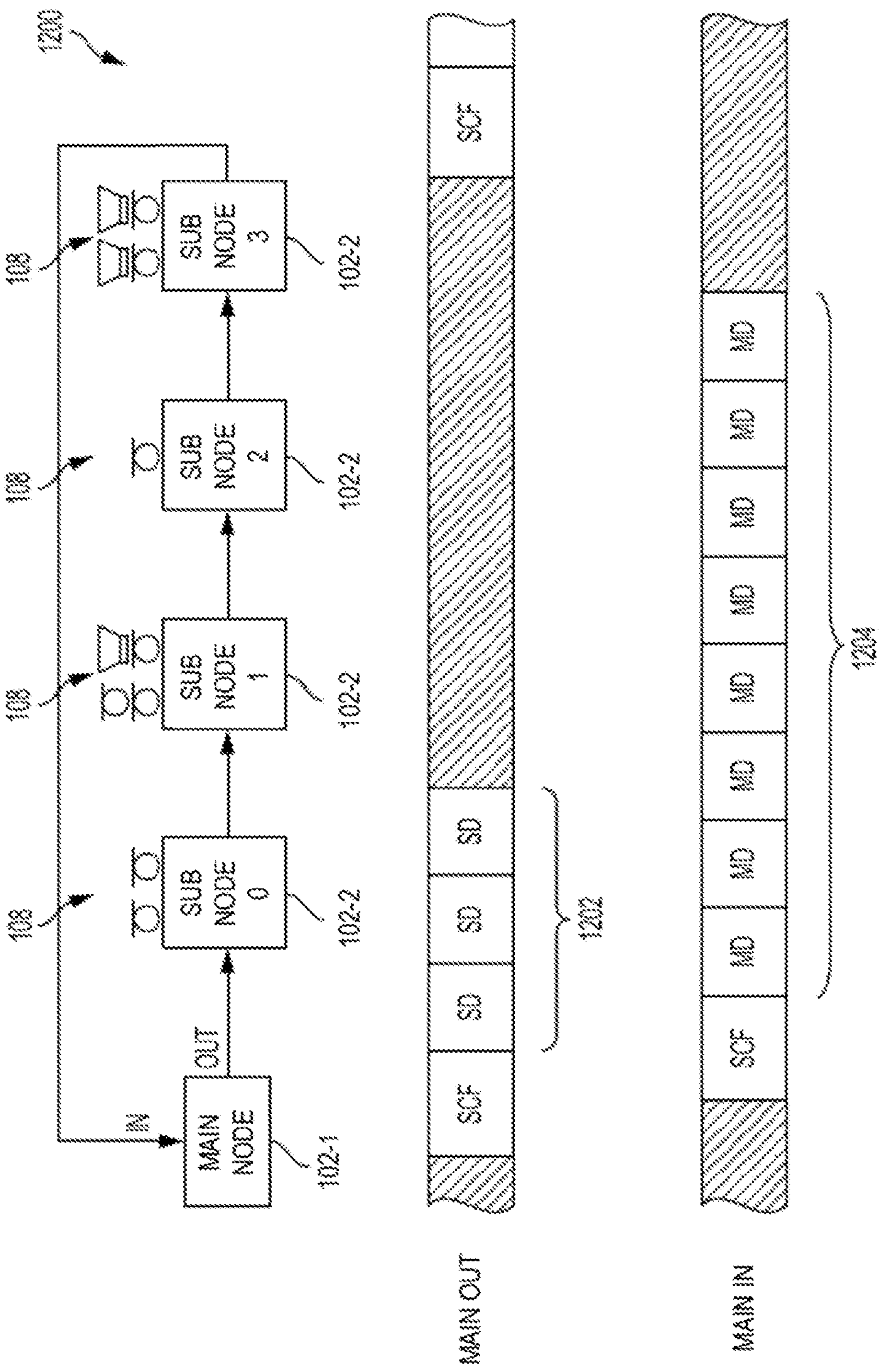
FIG. 12 illustrates a ring topology for the two-wire bus and a unidirectional communication scheme thereon, in accordance with various embodiments.

In some embodiments, the bus 106 may be configured for unidirectional communications in a ring topology. For example, FIG. 12 illustrates an arrangement 1200 of the main node 102-1 and four sub nodes 102-2 in a ring topology, and illustrates signaling and timing considerations for unidirectional communication in the arrangement 1200, in accordance with various embodiments. In such embodiments, the node transceivers 120 in the nodes may include a receive-only transceiver (MAIN IN) and a transmit-only transceiver (MAIN OUT), rather than two bi-directional transceivers for upstream and downstream communication. In the link-layer synchronization scheme illustrated in FIG. 12, the main node 102-1 transmits a SCF 180, optionally followed by "downstream" data 1202 for the three speakers coupled to various sub nodes 102-2 (the data for the different speakers may be arranged in any suitable order, as discussed above with reference to FIGS. 8-11), and each successive sub node 102-2 forwards the synchronization control frame 180 along with any "upstream" data from prior sub nodes 102-2 and "upstream" data of its own to provide "upstream" data 1204 (e.g., the data from the eight different microphones may be arranged in any suitable order, as discussed above with reference to FIGS. 8-11).

As described herein, data may be communicated between elements of the system 100 in any of a number of ways. In some embodiments, data may be sent as part of a set of synchronous data slots upstream (e.g., using the data slots 199) by a sub node 102-2 or downstream (e.g., using the data slots 198) by a sub node 102-2 or a main node 102-1. The volume of such data may be adjusted by changing the number of bits in a data slot, or including extra data slots. Data may also be communicated in the system 100 by inclusion in a synchronization control frame 180 or a synchronization response frame 197. Data communicated this way may include I2C control data from the host 110 (with a response from a peripheral device 108 associated with a sub node 102-2); accesses to registers of the sub nodes 102-2 (e.g., for discovery and configuration of slots and interfaces) that may include write access from the host 110/main node 102-1 to a sub node 102-2 and read access from a sub node 102-2 to the host 110/main node 102-1; and event signaling via interrupts from a peripheral device 108 to the host 110. In some embodiments, GPIO pins may be used to convey information from a sub node 102-2 to the main node 102-1 (e.g., by having the main node 102-1 poll the GPIO pins over I2C, or by having a node transceiver 120 of a sub node 102-2 generate an interrupt at an interrupt request pin). For example, in some such embodiments, a host 110 may send information to the main node 102-1 via I2C, and then the main node 102-1 may send that information to the sub node 102-2 via the GPIO pins. Any of the types of data discussed herein as transmitted over the bus 106 may be transmitted using any one or more of these communication pathways. Other types of data and data communication techniques within the system 100 may be disclosed herein.

Figure 13:
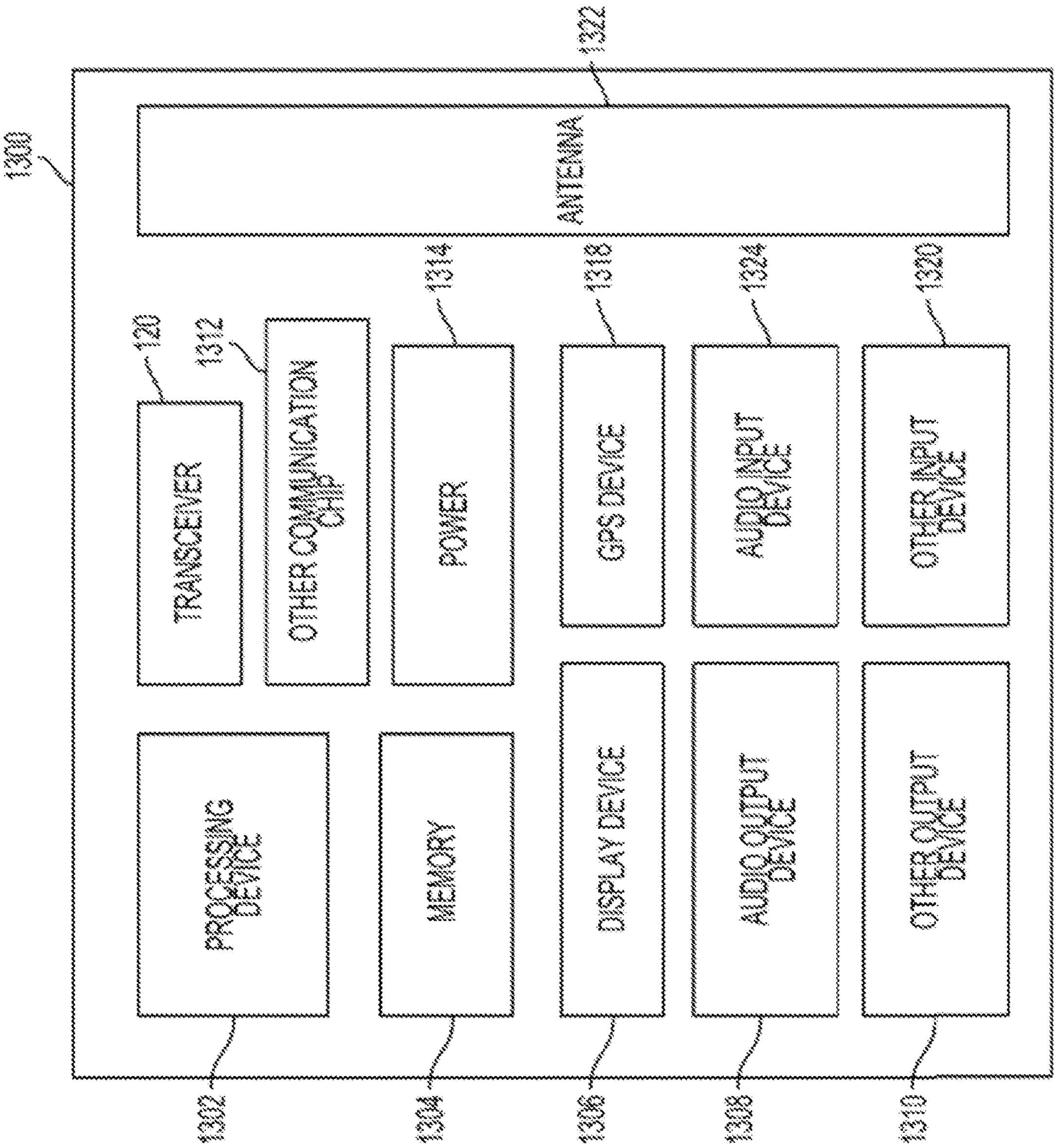
FIG. 13 is a block diagram of a device that may serve as a node or host in the system of FIG. 1, in accordance with various embodiments.

Embodiments of the present disclosure may be implemented into a system using any suitable hardware and/or software to configure as desired. FIG. 13 schematically illustrates a device 1300 that may serve as a host or a node (e.g., a host 110, a main node 102-1, or a sub node 102-2) in the system 100, in accordance with various embodiments. A number of components are illustrated in FIG. 13 as included in the device 1300, but any one or more of these components may be omitted or duplicated, as suitable for the application.

Additionally, in various embodiments, the device 1300 may not include one or more of the components illustrated in FIG. 13, but the device 1300 may include interface circuitry for coupling to the one or more components. For example, the device 1300 may not include a display device 1306, but may include display device interface circuitry (e.g., a connector and driver circuitry) to which a display device 1306 may be coupled. In another set of examples, the device 1300 may not include an audio input device 1324 or an audio output device 1308, but may include audio input or output device interface circuitry (e.g., connectors and supporting circuitry) to which an audio input device 1324 or audio output device 1308 may be coupled.

The device 1300 may include the node transceiver 120, in accordance with any of the embodiments disclosed herein, for managing communication along the bus 106 when the device 1300 is coupled to the bus 106. The device 1300 may include a processing device 1302 (e.g., one or more processing devices), which may be included in the node transceiver 120 or separate from the node transceiver 120. As used herein, the term "processing device" may refer to any device or portion of a device that processes electronic data from registers and/or memory to transform that electronic data into other electronic data that may be stored in registers and/or memory. The processing device 1302 may include one or more DSPs, ASICs, central processing units (CPUs), graphics processing units (GPUs), cryptoprocessors, or any other suitable processing devices. The device 1300 may include a memory 1304, which may itself include one or more memory devices such as volatile memory (e.g., dynamic random access memory (DRAM)), non-volatile memory (e.g., read-only memory (ROM)), flash memory, solid state memory, and/or a hard drive.

In some embodiments, the memory 1304 may be employed to store a working copy and a permanent copy of programming instructions to cause the device 1300 to perform any suitable ones of the techniques disclosed herein. In some embodiments, machine-accessible media (including non-transitory computer-readable storage media), methods, systems, and devices for performing the above-described techniques are illustrative examples of embodiments disclosed herein for communication over a two-wire bus. For example, a computer-readable media (e.g., the memory 1304) may have stored thereon instructions that, when executed by one or more of the processing devices included in the processing device 1302, cause the device 1300 to perform any of the techniques disclosed herein.

In some embodiments, the device 1300 may include another communication chip 1312 (e.g., one or more other communication chips). For example, the communication chip 1312 may be configured for managing wireless communications for the transfer of data to and from the device 1300. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

The communication chip 1312 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The one or more communication chips 1312 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The one or more communication chips 1312 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The one or more communication chips 1312 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1312 may operate in accordance with other wireless protocols in other embodiments. The device 1300 may include an antenna 1322 to facilitate wireless communications and/or to receive other wireless communications (such as AM or FM radio transmissions).

In some embodiments, the communication chip 1312 may manage wired communications using a protocol other than the protocol for the bus 106 described herein. Wired communications may include electrical, optical, or any other suitable communication protocols. Examples of wired communication protocols that may be enabled by the communication chip 1312 include Ethernet, controller area network (CAN), I2C, media-oriented systems transport (MOST), or any other suitable wired communication protocol.

As noted above, the communication chip 1312 may include multiple communication chips. For instance, a first communication chip 1312 may be dedicated to shorter-range wireless communications such as Wi-Fi or Bluetooth, and a second communication chip 1312 may be dedicated to longer-range wireless communications such as global positioning system (GPS), EDGE, GPRS, CDMA, WiMAX, LTE, EV-DO, or others. In some embodiments, a first communication chip 1312 may be dedicated to wireless communications, and a second communication chip 1312 may be dedicated to wired communications.

The device 1300 may include battery/power circuitry 1314. The battery/power circuitry 1314 may include one or more energy storage devices (e.g., batteries or capacitors) and/or circuitry for coupling components of the device 1300 to an energy source separate from the device 1300 (e.g., AC line power, voltage provided by a car battery, etc.). For example, the battery/power circuitry 1314 may include the upstream bus interface circuitry 132 and the downstream bus interface circuitry 131 discussed above with reference to FIG. 2 and could be charged by the bias on the bus 106.

The device 1300 may include a display device 1306 (or corresponding interface circuitry, as discussed above). The display device 1306 may include any visual indicators, such as a heads-up display, a computer monitor, a projector, a touchscreen display, a liquid crystal display (LCD), a light-emitting diode display, or a flat panel display, for example.

The device 1300 may include an audio output device 1308 (or corresponding interface circuitry, as discussed above). The audio output device 1308 may include any device that generates an audible indicator, such as speakers, headsets, or earbuds, for example.

The device 1300 may include an audio input device 1324 (or corresponding interface circuitry, as discussed above). The audio input device 1324 may include any device that generates a signal representative of a sound, such as microphones, microphone arrays, or digital instruments (e.g., instruments having a musical instrument digital interface (MIDI) output).

The device 1300 may include a GPS device 1318 (or corresponding interface circuitry, as discussed above). The GPS device 1318 may be in communication with a satellite-based system and may receive a location of the device 1300, as known in the art.

The device 1300 may include another output device 1310 (or corresponding interface circuitry, as discussed above). Examples of the other output device 1310 may include an audio codec, a video codec, a printer, a wired or wireless transmitter for providing information to other devices, or an additional storage device. Additionally, any suitable ones of the peripheral devices 108 discussed herein may be included in the other output device 1310.

The device 1300 may include another input device 1320 (or corresponding interface circuitry, as discussed above). Examples of the other input device 1320 may include an accelerometer, a gyroscope, an image capture device, a keyboard, a cursor control device such as a mouse, a stylus, a touchpad, a bar code reader, a Quick Response (QR) code reader, or a radio frequency identification (RFID) reader. Additionally, any suitable ones of the sensors or peripheral devices 108 discussed herein may be included in the other input device 1320.

Any suitable ones of the display, input, output, communication, or memory devices described above with reference to the device 1300 may serve as the peripheral device 108 in the system 100. Alternatively or additionally, suitable ones of the display, input, output, communication, or memory devices described above with reference to the device 1300 may be included in a host (e.g., the host 110) or a node (e.g., a main node 102-1 or a sub node 102-2).

The elements of a system 100 may be chosen and configured to provide audio and/or light control over the bus 106. In some embodiments, the system 100 may be configured to serve as a light control system in a vehicle or other environment, with lighting devices (e.g., strip-line light-emitting diodes (LEDs) or other LED arrangements) serving as peripheral devices 108 in communication with nodes 102 along the bus 106; data may be communicated over the bus 106 to control the color, intensity, duty cycle, and/or or other parameters of the lighting devices. In some embodiments, the system 100 may be configured to serve as an audio control system in a vehicle or other environment, with a microphone or other device including an accelerometer that may serve as a peripheral device 108 in communication with a node 102 along the bus 106; data from the accelerometer may be communicated over the bus 106 to control other peripheral devices 108 along the bus 106. For example, large spikes in the acceleration data or other predetermined acceleration data patterns may be used to trigger the generation of a sound effect, such as a cowbell or drum hit, by a processing device coupled to a node 102; that sound effect may be output by a speaker coupled to the processing device and/or by a speaker coupled to another node 102 along the bus 106. Some embodiments of the system 100 may combine any of the lighting control and/or audio control techniques disclosed herein.

Figure 14:
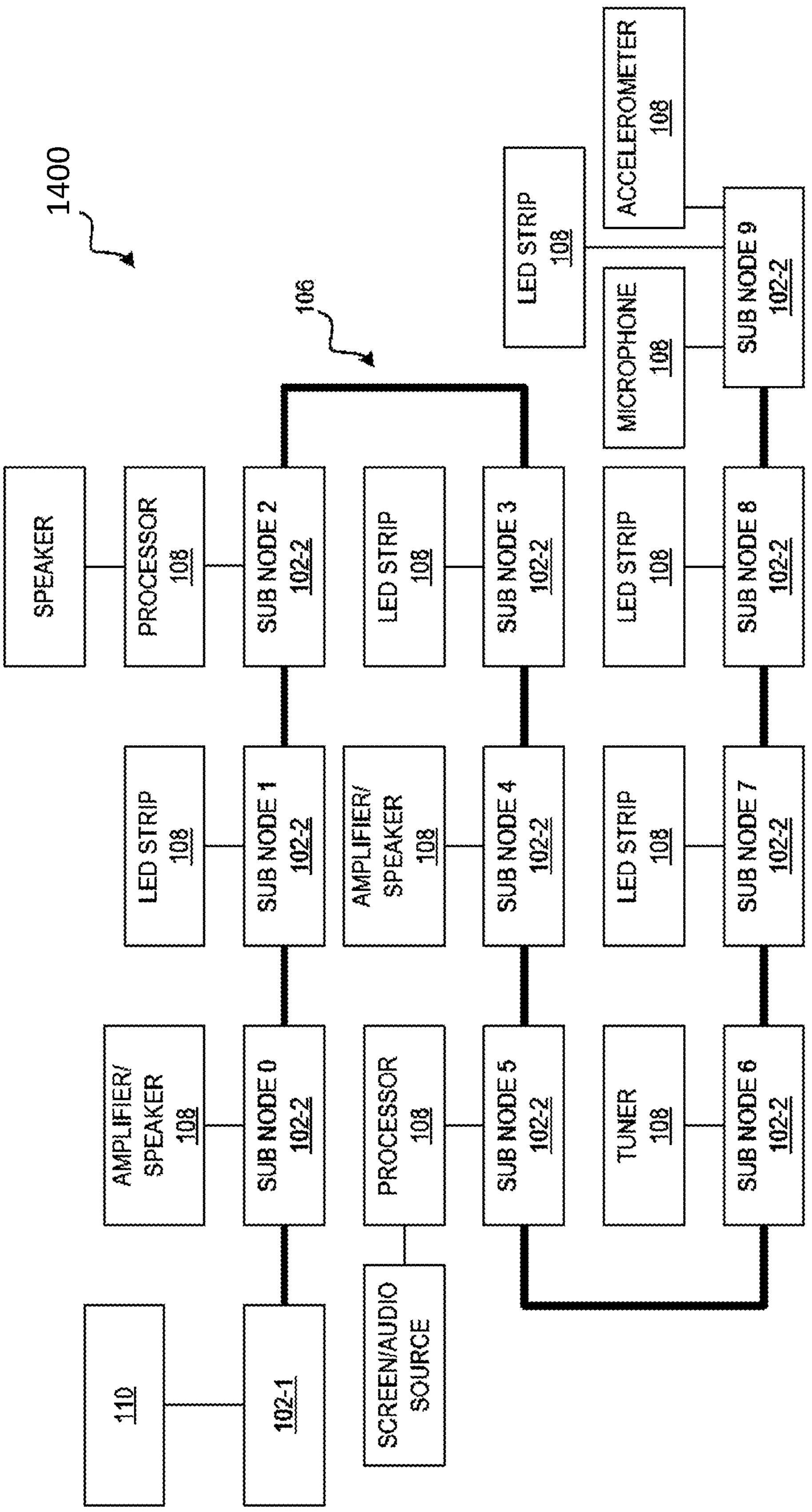
FIG. 14 is a block diagram of a communication system configured for audio and light control, in accordance with various embodiments.

FIG. 14 is a block diagram of a communication system 1400 configured for audio and light control, in accordance with various embodiments. In various examples, the system 1400 is an example of the system 100 of FIG. 1. The system 100 of FIG. 14 is simply illustrative, and the nodes 102 and associated peripheral devices 108 may be rearranged, omitted, and/or duplicated, as desired. In some embodiments, the links of the bus 106 between nodes 102 may be two-wire bus links, as disclosed herein, while in other embodiments, the links of the bus 106 between nodes 102 may be configured in accordance with other communication protocols. In some particular embodiments, the links of the bus 106 between nodes 102 may be unshielded cables that include a single twisted-wire pair. The system 1400 of FIG. 14 may include lighting and audio control functionality, but in other embodiments, the system 1400 of FIG. 14 may be used for lighting control without audio control, or vice versa. Further, the system 1400 of FIG. 14 may include some but not all of the lighting control functionality (e.g., the light organ functionality and the microphone lighting functionality) discussed herein.

FIG. 14 includes a host 110, a main node 102-1, and ten sub nodes 102-2 (labeled sub nodes 0-9). Any of the nodes 102 may include a node transceiver 120 in accordance with any of the embodiments disclosed herein. The host 110 may include a processing device, such as a DSP. In some embodiments, the host 110 and the main node 102-1 may be part of a head unit in an automobile. In some embodiments, the main node 102-1 may provide a bias voltage over the links of the bus 106 that may allow sub nodes 102-2 to power their peripheral devices 108; in some embodiments, such "phantom power" over the links of the bus 106 may support up to 50 Watts or more of power delivery and/or up to 24 volts or more of bias voltage.

In the system 1400 of FIG. 14, a sub node 0 may be coupled to a peripheral device 108 that includes an amplifier that may drive a speaker. Audio data for the amplifier/speaker may be provided along the bus 106 (e.g., from the screen/audio source communicatively coupled to the sub node 5, or from the tuner communicatively coupled to the sub node 6, as discussed below). In some embodiments, the amplifier/speaker communicatively coupled to the sub node 0 may be located in a door of a vehicle. In some embodiments, the peripheral devices 108 coupled to the sub node 0 may be powered by a bias on the upstream link of the bus 106, as discussed herein.

In the system 1400 of FIG. 14, a sub node 1 may be coupled to a peripheral device 108 that includes an LED strip (which may be used herein to generally refer to any arrangement of one or more LEDs). Data to control the color, intensity, duty cycle, flashing pattern, or other parameters of the LED strip may be communicated to the sub node 1 along the bus 106 (e.g., from the processor coupled to the sub node 5) and then output to the LED strip (e.g., using pulse width modulation (PWM) outputs of the node transceiver 120). In some embodiments, the LED strip communicatively coupled to the sub node 1 may be located proximate to footwells of a vehicle. In some embodiments, the peripheral devices 108 coupled to the sub node 1 may be powered by a bias on the upstream link of the bus 106, as discussed herein.

In the system 1400 of FIG. 14, a sub node 2 may be coupled to a peripheral device 108 that includes a processor. The processor may be communicatively coupled to a speaker. Audio data for the speaker may be provided along the bus 106 (e.g., from the screen/audio source communicatively coupled to the sub node 5, or from the tuner communicatively coupled to the sub node 6, as discussed below), received by the sub node 2, and provided to the processor serving as the peripheral device 108. The processor (e.g., an audio DSP) may perform desired audio signal processing on the audio data, and output the processed data to the speaker. In some embodiments, the speaker communicatively coupled to the sub node 2 may be located near the footwells of a vehicle. In some embodiments, the peripheral device 108 coupled to the sub node 2 may be powered by a power source separate from any bias on the upstream link of the bus 106.

In some embodiments, the processor communicatively coupled to the sub node 2 may perform echo canceling and/or feedback canceling for karaoke applications (discussed further below). For example, the processor may perform beamforming, feedback cancellation by shifting the microphone frequency, and subtraction of the audio signal. The processor may mix the karaoke sounds and, when the associated speaker is a subwoofer, may directly provide low frequency audio to the subwoofer. In karaoke applications, this processor may also direct audio output over the links of the bus 106 to the other speakers and to the main node 102-1 (which may utilize the sound input to control the lighting devices in the system 100 in a "light organ" application, as discussed further below).

In the system 1400 of FIG. 14, a sub node 3 may be coupled to a peripheral device 108 that includes an LED strip. Data to control the LED strip in any of the ways disclosed herein may be communicated to the sub node 3 along the bus 106 (e.g., from the processor coupled to the sub node 5) and then output to the LED strip (e.g., using PWM outputs of the node transceiver 120). In some embodiments, the LED strip communicatively coupled to the sub node 3 may be located proximate to footwells of a vehicle. In some embodiments, the peripheral devices 108 coupled to the sub node 3 may be powered by a bias on the upstream link of the bus 106, as discussed herein.

In the system 1400 of FIG. 14, a sub node 4 may be coupled to a peripheral device 108 that includes an amplifier that may drive a speaker. Audio data for the amplifier/speaker may be provided along the bus 106 (e.g., from the screen/audio source communicatively coupled to the sub node 5, or from the tuner communicatively coupled to the sub node 6, as discussed below). In some embodiments, the amplifier/speaker communicatively coupled to the sub node 4 may be located in a door of a vehicle. In some embodiments, the peripheral devices 108 coupled to the sub node 4 may be powered by a bias on the upstream link of the bus 106, as discussed herein.

In the system 1400 of FIG. 14, a sub node 5 may be coupled to a peripheral device 108 that includes a processor, which may in turn be communicatively coupled to a screen and/or an audio source (e.g., a DVD player). Audio data from the audio source may be selectively provided along the bus 106 by the processor via the sub node 5 (e.g., instead of or in addition to the audio data from the tuner communicatively coupled to the sub node 6, discussed below). In some embodiments, the screen/audio source communicatively coupled to the sub node 5 may be located in a door of a vehicle. In some embodiments, the peripheral devices 108 coupled to the sub node 5 may be powered by a power source separate from any bias on the upstream link of the bus 106.

In the system 1400 of FIG. 14, a sub node 6 may be coupled to a peripheral device 108 that includes a tuner. The tuner may include AM, FM, Digital Audio Broadcasting (DAB), and/or High-Definition (HD) tuning functionality. In some embodiments, the tuner may be controlled via SPI or I2C commands provided over the links of the bus 106; in particular, the links of the bus 106 may be used to remotely initialize the tuner, make channel changes, and to receive HD radio metadata like song/composer information or album cover images. Audio data from the tuner may be provided along the bus 106 via the sub node 6 to the sub node 2, received by the sub node 2, and selectively provided to other nodes 102 along the bus by the processor serving as the peripheral device 108 of the sub node 5 (e.g., instead of or in addition to the audio data from the audio source communicatively coupled to the sub node 5, as discussed above). In some embodiments, the tuner communicatively coupled to the sub node 2 may be located near the footwells of a vehicle. In some embodiments, the peripheral device 108 coupled to the sub node 6 may be powered by a bias on the upstream link of the bus 106, as discussed herein.

In vehicle settings, the tuner may not be located in the head unit of the vehicle, and may instead be located closer to an antenna (which may be located, for example, proximate to the roof of the vehicle). Such an implementation may reduce or eliminate the use of coaxial cables inside the vehicle cabin and/or may reduce or eliminate the use of antenna pre-amplifiers (which may be needed when the antenna is not directly connected to the tuner).

In the system 1400 of FIG. 14, a sub node 7 may be coupled to a peripheral device 108 that includes an LED strip. Data to control the LED strip in any of the ways disclosed herein may be communicated to the sub node 7 along the bus 106 (e.g., from the processor coupled to the sub node 5) and then output to the LED strip (e.g., using PWM outputs of the node transceiver 120). In some embodiments, the LED strip communicatively coupled to the sub node 7 may be located proximate to a roof of a vehicle. In some embodiments, the peripheral devices 108 coupled to the sub node 7 may be powered by a bias on the upstream link of the bus 106, as discussed herein.

In the system 1400 of FIG. 14, a sub node 8 may be coupled to a peripheral device 108 that includes an LED strip. Data to control the LED strip in any of the ways disclosed herein may be communicated to the sub node 8 along the bus 106 (e.g., from the processor coupled to the sub node 5) and then output to the LED strip (e.g., using PWM outputs of the node transceiver 120). In some embodiments, the LED strip communicatively coupled to the sub node 8 may be located proximate to a roof of a vehicle. In some embodiments, the peripheral devices 108 coupled to the sub node 8 may be powered by a bias on the upstream link of the bus 106, as discussed herein.

In the system 1400 of FIG. 14, a sub node 9 may be coupled to multiple peripheral devices 108 that may provide or consume data transmitted along the bus 106. The peripheral devices 108 may include a microphone (which may generate microphone data that may be transmitted along the bus 106 via the sub node 9), an LED strip (which may be controlled using data provided to the sub node 9 via the bus 106, in accordance with any of the embodiments discussed herein), and/or an accelerometer (which may generate accelerometer data that may be transmitted along the bus 106 via the sub node 9).

In some embodiments of the system 100 of FIG. 14, the microphone, the LED strip, and the accelerometer may all be part of a single integral handheld device (e.g., a handheld microphone with integral LEDs and an accelerometer). As noted above, in some embodiments, the system 100 may be configured to serve as an audio control system in a vehicle or other environment, with data from the accelerometer communicated over the bus 106 via the sub node 9 to control other peripheral devices 108 along the bus 106. For example, the acceleration data generated by the accelerometer may be communicated to the main node 102-1 over the bus 106 via the sub node 9. The main node 102-1 (e.g., a processing device communicatively coupled to the main node 102-1) may analyze the data to detect large spikes or other predetermined acceleration data patterns. Upon detection of such patterns, the main node 102-1 may cause audio data corresponding to a sound effect to be transmitted over the bus 106 to the sub node 2, where the processor communicatively coupled to the sub node 2 may mix this sound effect and other audio data, and may provide the mixed data to the bus 106 to be output by any desired one or more of the speakers of the system 1400. The main node 102-1 may be configured to detect different acceleration data patterns (e.g., corresponding to different movements of a user holding the microphone), and cause correspondingly different sound effects to be generated. In some embodiments, such a system 100 may be configured to act as a karaoke system, with song-related audio and video information (e.g., including the lyrics of the song) provided by the screen/audio source communicatively coupled to the sub node 5, a user's voice provided by the microphone communicatively coupled to the sub node 9, and sound effects triggered by data from the accelerometer communicatively coupled to the sub node 9 (e.g., sharing a housing with the microphone).

In some embodiments, the system 1400 of FIG. 14 may be configured to act as a light organ. As used herein, a "light organ" may refer to a system in which lighting devices (e.g., LEDs) are operated in a manner that is synchronized with accompanying music. For example, the main node 102-1 (e.g., a processing device, such as a DSP, communicatively coupled to the main node 102-1) may receive audio data from the screen/audio source or from the tuner, may perform beat detection and/or frequency analysis operations on the received audio data, and may output control signals for the LED strips in the system 100 to cause the LED strips to output light in a pattern that "matches" the audio data. In this manner, the lighting emitted by the system 100 may vary and may be synchronized with music played by the system 100. In some embodiments, one or more of the LED strips included in the system 100 may "flash" in accordance with the detected beat of the music and/or may change color depending upon the dominant instantaneous frequencies of the music. In some embodiments, the LED strip integral with a microphone (as discussed above) may be controlled in this light organ fashion (e.g., during karaoke). In other embodiments, the microphone may be wireless.

Although various ones of the embodiments discussed above describe the system 1400 in a vehicle setting, this is simply illustrative, and the system 1400 may be implemented in any desired setting. For example, in some embodiments, a "suitcase" implementation of the system 1400 may include a portable housing that includes the desired components of the system 1400; such an implementation may be particularly suitable for portable applications, such as portable karaoke or entertainment systems.

The systems 1400 disclosed herein may be implemented for static configurations of nodes 102 and for dynamic configurations of nodes 102. For example, a system 1400 implemented in a vehicle setting may be relatively static, with nodes 102 "hardwired" into the vehicle, while a system 1400 implemented in a music studio or entertainment venue setting may be relatively dynamic, with nodes 102 (e.g., associated with instruments, amplifiers, microphones, etc.) connected and disconnected during operation. In dynamic settings, the ability of the system 1400 to adapt to connections and disconnections of nodes 102 without significant operational interruptions may be particularly important, but such adaptivity may also be important in static settings (e.g., in safety critical systems 1400 in which the failure of a node 102 should not cause the failure of the entire system 1400). While adaptation to device connections and disconnections may be a part of some point-to-point communication systems, the approaches used in such systems may not be applicable to daisy-chained systems.

Thus, a system 1400 may include "auto-discovery" and "auto-reconfiguration" functionality to respond to changes in network topology and/or device identify while preserving the communication of data along a bidirectional, daisy-chained bus 106. FIGS. are flow diagrams of various methods for node discovery and configuration in a daisy-chained network, in accordance with various embodiments. The methods of FIGS. 15-20 may be performed by a host 110 of a system 1400. Any of the methods of FIGS. 15-20 may be implemented in any of the systems 100 and systems 1400 disclosed herein (e.g., a system 1400 configured for audio and lighting control, as discussed above with reference to FIG. 14). The methods of FIGS. 15-20 may provide self-discovery and self-configuration for nodes 102 in the daisy-chained system 1400, enabling "plug and play" of new nodes 102. The methods of FIGS. 15-20 may allow a main node 102-1 to auto-discover the sub nodes 102-2 in a system 1040 without prior system network configuration information. A main node 102-1 may query the sub nodes 102-2 for their function and capabilities, may automatically configure the system 100 accordingly, and may react to changes in the system 1400 (e.g., a sub node 102-2 joining the system 1400 or a sub node 102-2 leaving the system 1400). The methods of FIGS. 15-20 include automatic rediscovery of sub nodes 102-2 and reconfiguration of the system 1400. The method of FIG. 15 includes a dynamic node reconfiguration process in which a node 102 may announce a new configuration for itself. In such a process, a node 102 may change its configuration after being discovered. For example, the number of peripheral devices 108 (e.g., one or more guitars or other instruments) coupled to a node 102 (e.g., a sub node 102-2) may change during operation of the system 1400; in response to the change in the number of peripheral devices 108, the number of data slots needed for the node 102 may change. In such a situation, a node 102 may announce its updated number of peripheral devices 108 (e.g., through a mailbox exchange between the node 102 and the host 110), and the response to the announcement may include a dynamic reconfiguration of the system 1400 to provide the node 102 with an appropriate number of data slots.

In some implementations, a host (or microcontroller) does not know what will be connected to it, and instead, automatically determines how many nodes are on the network. The host also configures the nodes based on information locally stored in each of the sub-nodes, and sets up the bus. In some examples, the bus is an A2B bus. The host sets up the bus without prior knowledge of how many nodes are on the bus or what type of node each node is. The host is able to add and remove nodes as the nodes are added and/or removed from the bus. For example, if a node is disconnected from the bus, the host determines that the node was disconnected and reconfigures the bus to work without the disconnected node. This is in contrast to a method of sending out a command until a PLL locks on the node and then programming the node knowing what the node is supposed to be.

Figure 15A:
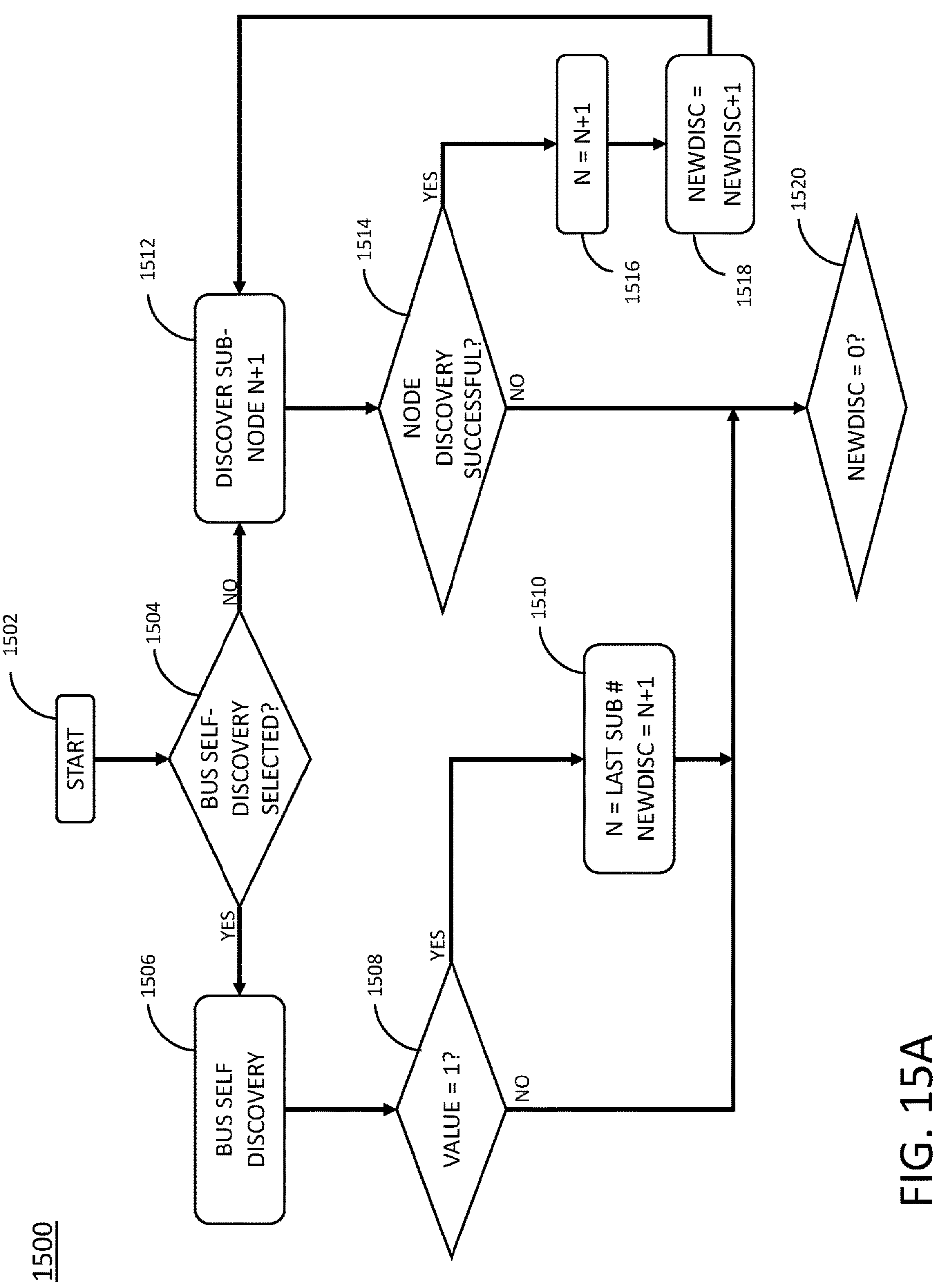
FIGS. 15A and 15B illustrate a method for node discovery, in accordance with various embodiments.
Figure 15B:
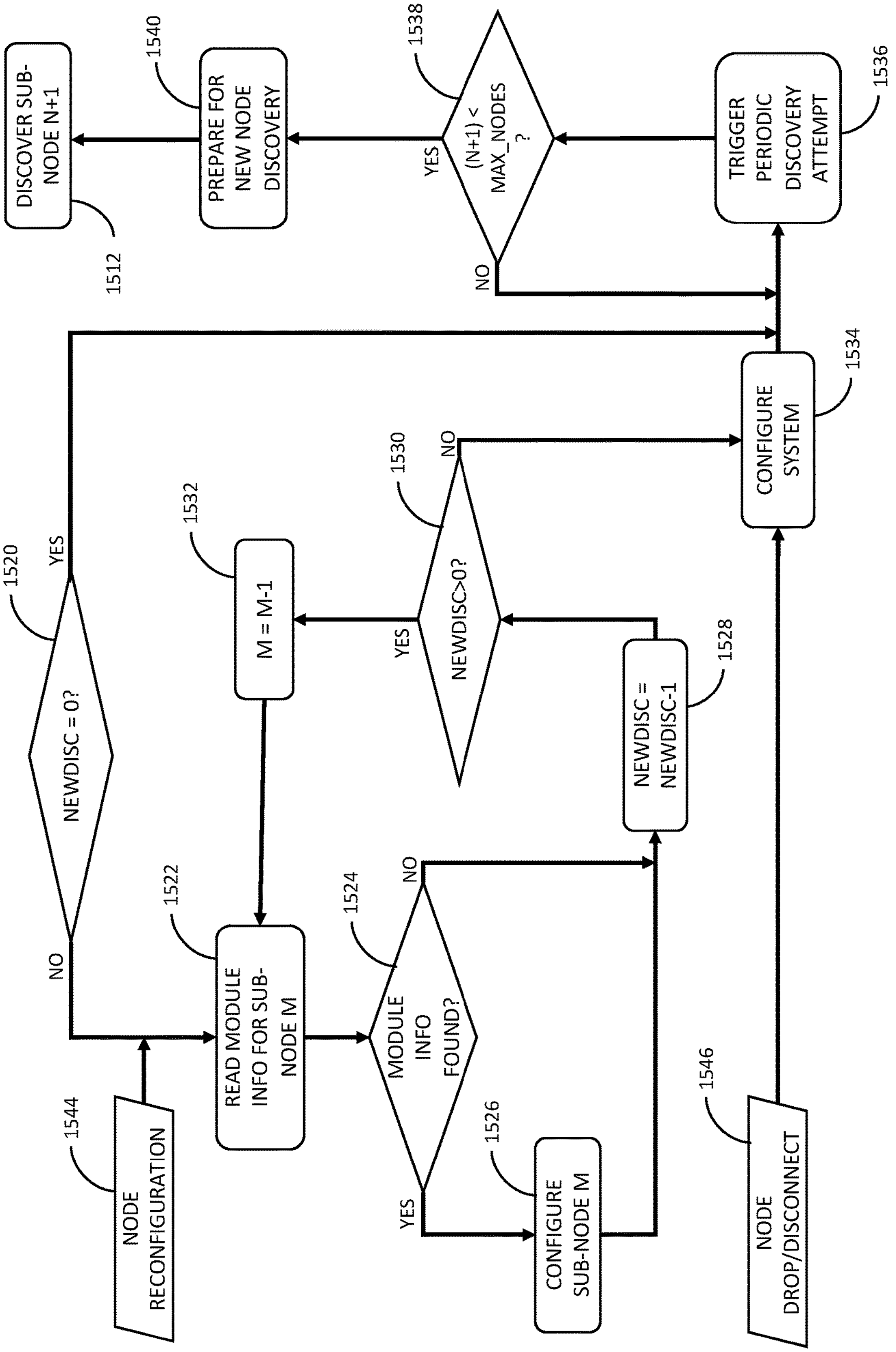

FIGS. 15A and 15B illustrate a method 1500 for node discovery, in accordance with various embodiments. In various implementations, the method 1500 is a method for node discovery in a daisy-chained network having multiple connected nodes. According to various examples, the host does not know what nodes will come online and what any nodes that are connected to the bus will be programmed to. Each node informs the host what it is to be configured as. In some examples, a node informs the host how the inter integrated circuit ($i^2c$) interface and/or $i^2s$/tdm interface is to be configured. In some examples, nodes can have any selected order, such that a particular device that is node five in one system is node eight in a different system. Additionally, in some examples, nodes include erasable programmable read-only memory (EPROM) which contains node identification and configuration information.

Referring to FIG. 15A, the method 1500 starts at the start box 1502. At the start box 1502, the variable N=−1 and the variable NewDisc=0 (where N is the last discovered sub-node number, and NewDisc is the count of newly discovered nodes). At step 1504, it is determined whether bus self-discovery is selected. In particular, if a chip is in a bus self-discovery mode, the chip can query the nodes that are present in the network and determine how many nodes are present in the network. As shown in FIG. 15A, bus self-discovery is an entry point decision at start-up, at step 1504. In some examples, bus self-discovery is a feature in a bus transceiver, and in some examples, bus self-discovers is a feature in an A2B transceiver.

If at step 1504, bus self-discovery is selected, the method 1500 proceeds to step 1506. The bus self-discovery loop includes steps 1506, 1508, and 1510. In various examples, bus self-discovery occurs in hardware. Step 1506 includes a bus self-discovery loop (not shown) in which the host discovers as many nodes as possible. In some examples, bus self-discovery at step 1506 ends when there is a line fault because there is no next node (e.g., 5 nodes were found but no 6th node was discovered). In some examples, bus self-discovery at step 1506 ends at a time-out. In particular, bus self-discovery got stuck and did not finish, and a time-out fail-safe mechanism ended the bus self-discovery loop. In some examples, bus self-discovery at step 1506 ends when there is a short of cables.

In various examples, hardware self-discovery runs using a main node clock. In some examples, self-discovery determines the number of nodes but does not configure the nodes. Self-discovery can allow the quick discovery of nodes and bus bias. In some examples, connected, discovered nodes can begin booting themselves while the host is booting. In some examples, hardware-supported discovery can be interrupted if there are any interrupts or other unforeseen circumstances. In some implementations, a microcontroller takes a long time to boot up that bus self-discovery can begin while the microcontroller is starting. In some examples, a key point of bus self-discovery is determining how many nodes are present in the network, and determining at what point the system should begin looking for the next node.

Once the host has completed looking for nodes at step 1506, the method 1500 proceeds to step 1508, and determines whether any sub-nodes were discovered. In particular, if the value at 1508 equals 1, then one or more sub-nodes was discovered during the bus self-discovery step 1506. At step 1510, the variable N is set to equal the last discovered sub-node number, and the variable NEWDISC is set to N+1, which is the count of newly discovered nodes. The method 1500 then proceeds to step 1520. At step 1508, if the value does not equal 1, then no nodes were discovered at the bus self-discovery step 1506, and the method 1500 proceeds to step 1520. As described below with respect to FIG. 15B, step 1520 determines whether there are any newly discovered nodes, and subsequent steps vary depending on whether there are any newly discovered nodes at step 1520.

Referring back to step 1504, if bus self-discovery mode is not selected, the method proceeds to step 1512 and the host controller begins querying, node by node, the nodes that are present in the system. In some examples, a microcontroller connects with a first node in the system (a main node), and then attempts to discover the next node by periodically sending out a synchronization control frame. The next node receives the synchronization control frame and attempts to lock to the synchronization control frame and answer the synchronization control frame. In this method, communication is established between the microcontroller and sub nodes in the network.

At step 1512, sub-node N+1 discovery is attempted. Since at the start box 1502, N=−1, the first time step 1512 is performed, sub-node 0 discovery is attempted. At step 1514, it is determined whether node discovery was successful. Thus, the first time 1514 is performed, it is determined whether discovery of sub-node 0 was successful. That is, at step 1514, it is determined whether node 0 was discovered. If no node 0 was discovered, the method proceeds to step 1520. If the node was successfully discovered at step 1514, the method proceeds to step 1516 where the value of N is incremented by 1 and the value of NewDisc is also incremented by 1. The method then returns to step 1512 wherein the next sub-node (sub-node N+1) discovery is attempted. In various examples, the loop including steps 1512, 1514, 1516, and 1518 is repeated until no new sub-nodes are discovered at step 1514, and then the method 1500 proceeds to step 1520. According to some examples, whether hardware bus self-discovery is performed by A2B transceiver chip or sub-nodes are discovered using a microcontroller software, the same steps are performed.

Once no more nodes are discovered at step 1514, or bus self-discovery is completed at step 1508 or step 1510, the method proceeds to step 1520. If there were no newly discovered nodes at step 1506 or step 1512, at step 1520, NewDisc=0 and the method 1500 proceeds to step 1536. At step 1536, the discovery attempt is periodically triggered. That is, the system periodically searches for new nodes. In some examples, the discovery attempt at step 1536 is triggered once every second.

When the discovery attempt is triggered, the method checks, at step 1538 whether the bus already includes the maximum number of nodes. If the maximum number of nodes has been reached at step 1538, the method returns to step 1536 where the discovery attempt continues to be periodically triggered. In particular, in various examples, a node can be dropped or disconnected, decreasing the number of nodes and allowing the method to proceed to step 1540. At step 1540, the bus prepares for new node discovery by setting the value of NewDisc back to zero. Then the method returns to step 1512, discussed above with respect to FIG. 15A.

At step 1520, if NewDisc does not equal zero, there are one or more newly discovered nodes. A new variable M is set to equal N, and the method 1500 proceeds to step 1522. At step 1522, the module information for sub-node M is read. In some examples, an EPROM in the sub-node includes sub-node information such as sub-node type, vendor, model, and capabilities. In various examples, while the EPROM contains information on, for instance, device capabilities, a device may not be programmed to include these capabilities.

At step 1524, it is determined whether the module information for sub-node M was found. If the module information for sub-node M was found, the method proceeds to step 1526, and the module at sub-node M is configured. In some examples, the module at sub-node M is configured based on information read out from the sub-node. In some examples, the module at sub-node M is configured based on information found in a look-up table and/or using stored code in the microcontroller. In some examples, the module at sub-node M is configured based on code stored in the sub-node. In various examples, when the host knows what the sub-node is, the host knows how to configure it.

In one example, three nodes are discovered, so NewDisc=3, and at step 1522, the host is looking at module information for sub-node three. At step 1524, it is determined that sub-node three module information was found, and at step 1526, sub-node three is configured. If sub-node three information was not found at step 1524, the method proceeds directly to step 1528, skipping the sub-node configuration step 1526. The method proceeds to step 1528, where NewDisc is decreased by one (NewDisc=NewDisc−1, so in this example, NewDisc=2) and then to step 1530, where it is determined whether NewDisc is greater than zero. If NewDisc is greater than zero, the method proceeds to step 1532, where M is decreased by one (M=M−1, so in this example, M decreases from three to two and M=2), and the method 1500 returns to step 1522, wherein module information for sub-node two is read.

The loop including step 1522, step 1524, possibly step 1526, step 1528, step 1530, and step 1532 is repeated for sub-node two and sub-node one. After the loop is performed for sub-node one, at step 1528, NewDisc will be decreased by one and will equal zero, indicating that any newly discovered nodes have been queried, and, when possible, configured. At step 1530, NewDisc is not greater than zero and the method proceeds to step 1534 for system configuration.

At step 1534, the system is configured, including previous and new sub-nodes. In some examples, the system configuration assigns one or more slots to each sub-node. In various examples, slots are assigned once the sub-nodes are known. At step 1534, system configuration can be performed any time a new node is added, a node is dropped or disconnected, or the configuration of nodes changes without a change in the number of nodes.

As shown in FIG. 15B, at step 1546, node disconnect or dropped node information is detected and causes the method to return to step 1534 to reconfigure the system. In general, the system periodically checks for disconnected and/or dropped nodes. For example, the system can check for dropped and/or disconnected nodes once per second, or ten times per second. In one example a dropped and/or disconnected node causes interrupts to network host and causes a new variable N to be generated. The system is adjusted for the new configuration. In some examples, a missing frame causes an error and/or an interrupt. The system then looks for the missing frame and concludes that a node was dropped and/or disconnected. In various implementations, a disconnected node triggers an interrupt in the system, which is a parallel process because of the interrupt signal, and thus the system knows when a node is disconnected. In various examples, the variable N is updated to reflect the last active node number after a dropped and/or disconnected node is detected.

In various examples, when new nodes are added at the system, the system is reconfigured at step 1534 and continues to run. In particular, at step 1536, while the system is running, a node discovery attempt is periodically triggered. In some examples, the node discovery attempt is triggered one time per second, two times per second, ten times per second, or more than ten times per second. In some examples, the node discovery attempt is triggered less frequently than one time per second. The value of the variable N from FIG. 15A is one less than the last known number of nodes (since the first node is node zero and N represents the last active node number), and at step 1538 it is determined whether the current number of nodes is less than the maximum number of nodes. If the system currently includes the maximum number of nodes, at 1538, the method 1500 returns to step 1536.

If the system includes fewer than the maximum number of nodes at step 1538, the method 1500 proceeds to step 1540 where it prepares for new node discovery by setting NewDisc to zero. Then the method returns to step 1512 of FIG. 15A wherein it attempts to discover sub-node N+1. If no new sub-node N+1 is discovered at step 1514, the method 1500 proceeds to step 1520, where NewDisc will still equal zero, and the method returns to step 1536 for periodic node discovery attempts. If a new sub-node N+1 is discovered at step 1514, the method 1500 proceeds to step 1516, and eventually to steps 1522, 1524, 1526, 1528, and 1530 to query and configure any new nodes.

Because the system can be reconfigured as nodes are added and/or dropped, the location of various types of peripherals on the bus can change. Thus, there are no fixed slot numbers for various peripherals, as the slot location for any particular peripheral can change. Since there are no fixed slot numbers, the locations of various upstream slots can shift around depending on how many nodes are contributing to the upstream system. Thus, for example, the number of nodes that have microphone information can vary, and the slots on which to find microphone data can change. Therefore, the location in the frame in which the audio content is located can vary depending on the number of nodes connected to the system.

As mentioned above, in some implementations, no nodes are added or dropped, but an existing node is changed. For example, more capability can be added to an existing node. A six-channel box and/or a ten-channel box can have additional devices added or current devices removed, changing the multi-channel box node. For instance, a box with one guitar connected to it can have an additional guitar added, such that it suddenly provides more data than it did before.

Step 1544 detects a node reconfiguration. In various examples, step 1544 is a parallel process that checks if a node announces a new configuration. In some implementations, a node change is discovered by the parallel process at step 1544, and the method 1500 jumps to step 1544 for node reconfiguration. In some examples, a node configuration change can be detected by the microcontroller. In some examples, a change in node configuration triggers an interrupt, causing system reconfiguration.

At step 1544, the number of newly discovered nodes is set to one (NewDisc=1) and the variable M is set to equal the node number for reconfiguration. For example, if node three was reconfigured, M is set to equal three. In some examples, a reconfigured node is an intelligent node that has a local microcontroller with wireless connectivity, and a node firmware update changes the capability of the node. After step 1544, the method proceeds to step 1522 where module information for the sub-node M is read. Changing one node can impact the rest of the nodes as well. For example, the position of the slots can be affected. For instance, a node that used two channels might now use four, so the slots are re-allocated. Once the nodes are configured, the method 1500 returns to step 1534 where the system is reconfigured.

In some examples, node reconfiguration at step 1544 is periodically checked, for example one time per second, less than once per second, or more than once per second. In some examples, when the method 1500 is waiting at step 1536 for the next periodic discovery attempt to be triggered, the system checks for node reconfigurations at step 1544. In some examples, when the method 1500 is waiting at step 1536 for the next periodic discovery attempt to be triggered, the system checks for node drops and/or disconnects at step 1546.

In various implementations, when the method 1500 is not discovering new nodes, node reconfigurations, or node drops/disconnect, the system is in a standard states simply running the existing configuration. In various examples, the steps of the method 1500 are so fast that the system spends most of its time in the standard state simply running the existing configuration.

Figure 16:
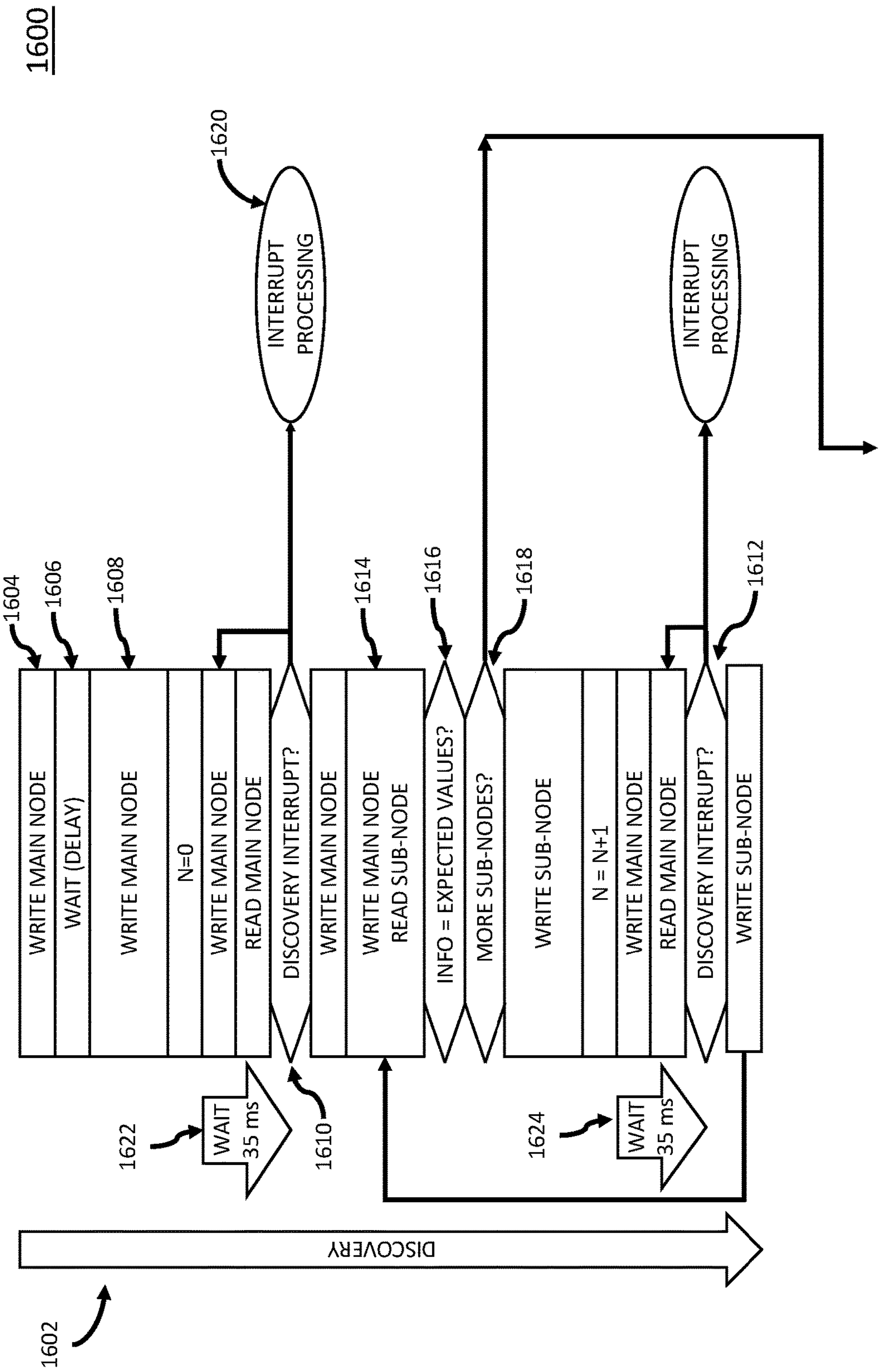
FIG. 16 is an example of a sequence for discovery of a sub-node, in accordance with various embodiments.

FIG. 16 is an example 1600 of a sequence for discovery of a sub-node, according to various embodiments of the disclosure. According to various implementations, the sequence for discovery shown in FIG. 16 is an example of a discovery sequence performed at step 1512 of FIG. 15A. Each block of the sequence represents a step, and the sequence begins at the top moving downwards as illustrated by the "discovery" arrow 1602.

The first six blocks of the sequence show communication with the main node. In particular, the sequence starts with a write command to the main node. In some examples, a microcontroller is connected to a first node and the microcontroller tells the first node that it is the main node. In some examples, the microcontroller communicates with the first node via a $i^2C$ interface. After a delay at the second block, more commands are written to the main node. In particular, commands can include telling the next node when to start responding, and information about when synchronization control frames are sent. In some examples, commands can include, once the phase lock loop (PLL) is locked to a sub-node, when to start responding. In some examples, a new structure means that once one or registers are programmed, synchronization control frames will start being sent. In some examples, an interrupt mask is set. In various implementations, a host or microcontroller determines whether it is talking to a main node or a sub-node.

In some examples, if the microcontroller is talking to a sub-node, this is written in the main node, in the node register (e.g., 3 for subnode 3). In particular, the sub-node number is set in the main node such that the subsequent reads and writes to the sub-node will use that node number. In various examples, the write commands include a switch control, which switches bus power on a bus pin (e.g., an A2B pin). Line diagnostics can be done based on the switch control command. Additionally synchronization control frames can be sent out on the bus pin. After the variable N is set to zero, there is a maximum waiting period for discovering a node and for a sub-node to start responding. According to various examples, if there is no response within a selected period of time, a time-out occurs and the sequence ends at 1620. According to various examples, the "WAIT" arrows 1622, 1624 represent the time-out period. In some examples, as shown in FIG. 16, the wait period is 35 ms. In various examples if a response to the periodically transmitted synchronization control frame is not received within the wait period 1622, 1624, the system can time-out. However, normally a response is received, and the method ends with an interrupt (e.g., block 1610, 1612) indicating that sub-node discovery is done and response were received.

When a sub-node is discovered, the information from the sub-node is read at block 1614. In various examples, the information includes one or more of vendor information, product information, version information, and model information. At block 1616, it is determined whether the information read at block 1614 matches expected values. If the information does not match expected values, the sequence can be ended with an invalid sub-node error. In some examples, if there are additional sub-nodes, the sequence is continued allowing for configuration of the additional sub-nodes. In some examples, there can be various types of interrupts, such as a disconnected line.

At block 1618, the system determines if there are more sub-nodes to discover. If there are no further sub-nodes, the sequence ends. If there are additional sub-nodes, the sequence continues until all the sub-nodes have been discovered.

Figure 17:
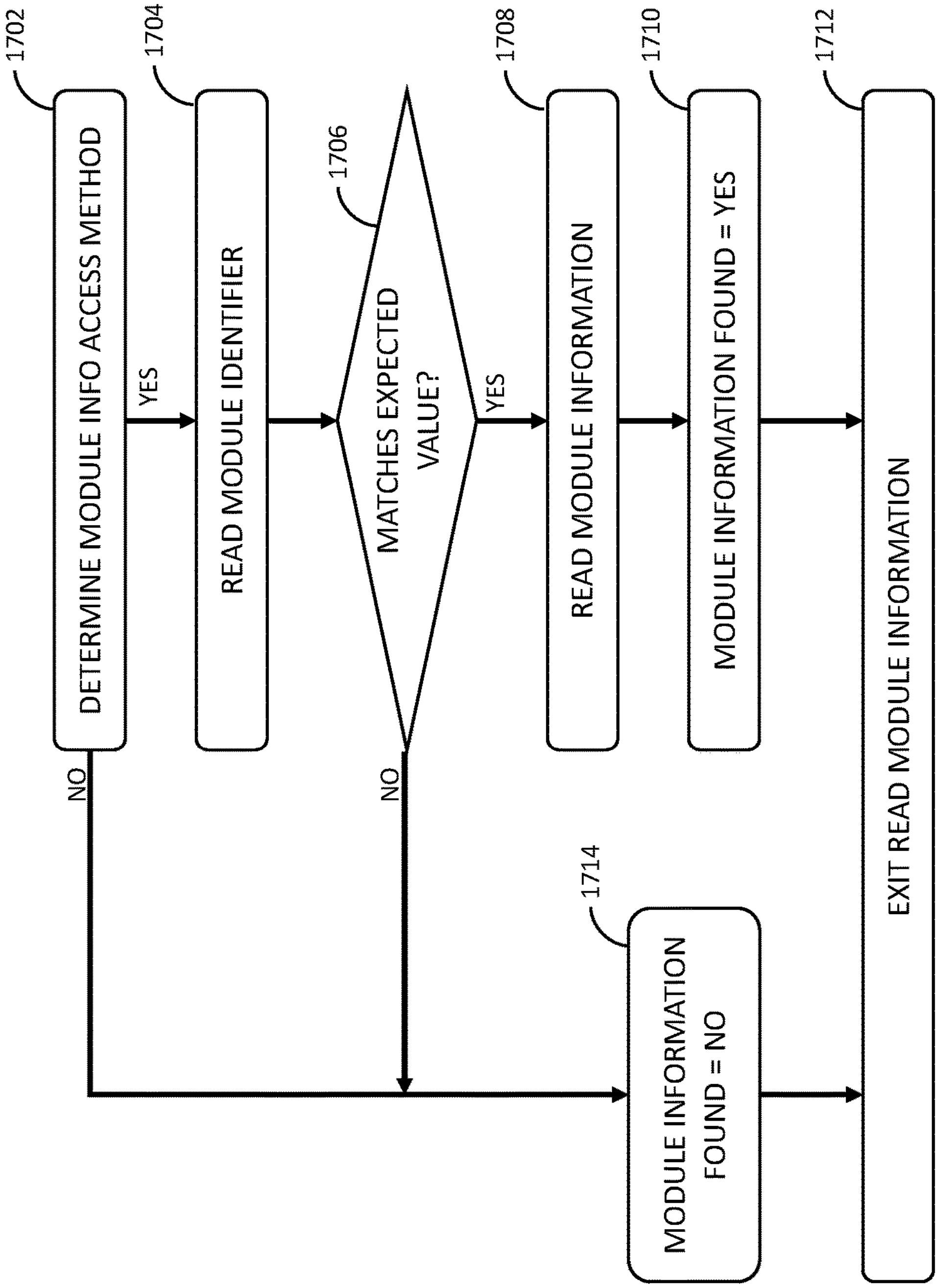
FIG. 17 shows a method for reading module information for a sub-node, in accordance with various embodiments.

FIG. 17 shows a method 1700 for reading module information for a sub-node, according to various embodiments of the disclosure. In some examples, the method 1700 is performed at step 1522 of FIG. 15B. At step 1702, the module information access method is determined. Examples of module information access methods include accessing a memory device (e.g., via I2C or SPI), accessing a mailbox, pin strapping, and accessing a one-time-programmable (OTP) memory or a Flash memory. If there is not module information access method at step 1702, the method 1700 proceeds to step 1714. At step 1714, the system sets a module information found variable to no, indicating that module information was not found, since the module information access method was not determined. In some examples, the "module information found" variable is read at step 1524 of FIG. 15B. If the module information access method is determined at step 1702, the method proceeds to step 1704, and the module identifier is read.

At step 1706, it is determined whether the module identifier matches with an expected value. If the module identifier does not match an expected value, the method proceeds to step 1714. If the module identifier matches an expected value, the method proceeds to step 1708, where module information is read. Examples of module information that may be read in the method of FIG. 17 include version information, vendor information, product information, capability information, serial number, make information, model information, configuration information, routing information, authentication information, and/or calibration coefficients. In some examples, module information is found on an EPROM, e.g., an $i^2C$ connected EPROM. In some examples, module information is found on a sub-node microcrontroller, and in some examples module information is found on a sub-node microcontroller which is exchanged over Mailbox feature of A2B. The method proceeds to step 1710 where it verifies that module information was found (and may set an associated variable accordingly). Following step 1710 (or step 1714), the method 1700 proceeds to step 1712 where it exits the read module information method.

Figure 18:
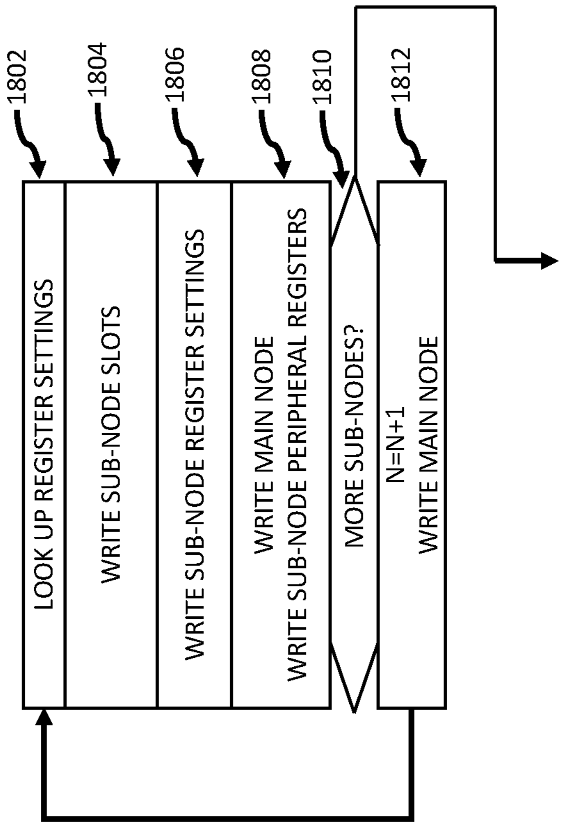
FIG. 18 is a flow chart showing a sequence 1800 for configuring a sub-node, in accordance with various embodiments.

FIG. 18 is a flow chart showing a sequence 1800 for configuring a sub-node, according to various embodiments of the disclosure. In some examples, the sequence 1800 is performed at the step 1526 of FIG. 15B. The sequence 1800 can be used to configure a sub-node based on module information from the method 1700. At block 1802, register settings for the sub-node are looked up. At block 1804, sub-node slots are written to the sub-node. Slots can include local slots, up slots, down slots, broadcast slots, and any other slots. At block 1806, other register settings are applied to the sub-node, such as $i^2C$ settings and $i^2C$ peripheral addresses. At block 1808, registers of sub-node peripherals are set, and after writing to main node registers to enable such peripheral access. At block 1810, it is determined whether there are additional sub-nodes to configure. If there are additional sub-nodes to configure, the sequence 1800 proceeds to step 1812, and N is incremented by one, information is written on the main node, and the sequence returns to block 1802. If there are no additional sub-nodes to configure, the sequence 1800 ends. In some examples, the sequence 1800 can be performed for new sub-nodes, and in some examples, the sequence 1800 is performed for all sub-nodes. Once sub-nodes are configured, the system including the sub-nodes is configured.

In some embodiments, a node 102 may automatically switch between acting as a sub node 102-2 and acting as a main node 102-1 in order to start and/or sustain network operation. The functionality illustrated in FIGS. 15-18 may enable the application of the systems 100 disclosed herein in settings in which it is desirable for a network to self-configure without user intervention.

SELECT EXAMPLES

Example 1 provides a method for node discovery and configuration in a daisy-chained network including a plurality of nodes comprises: determining at least one new sub-node has been added to the plurality of nodes; discovering the at least one new sub-node; reading module information for the at least one new sub-node; configuring the at least one new sub-node; configuring a system including the daisy-chained network, based on information from each of the plurality of nodes; and periodically triggering a discovery attempt, wherein the discovery attempt including determining whether at least one newer sub-node has been added to the daisy-chained network.

Example 2 provides a method according to any of the preceding and/or following examples, wherein determining that at least one new sub-node has been added to the plurality of nodes further comprises bus self-discovery, wherein a host controller queries the plurality of nodes present in the network.

Example 3 provides a method according to any of the preceding and/or following examples, wherein bus self-discovery occurs at system start up.

Example 4 provides a method according to any of the preceding and/or following examples, wherein bus-self-discovery includes determining a number of nodes in the plurality of nodes.

Example 5 provides a method according to any of the preceding and/or following examples, wherein the plurality of nodes is a first plurality of nodes and further comprising: detecting a disconnection of a current node from the first plurality of nodes, and reconfiguring the system based on information from each of a second plurality of nodes, wherein the second plurality of nodes includes connected nodes from the first plurality of nodes.

Example 6 provides a method according to any of the preceding and/or following examples, further comprising detecting a reconfiguration of a first sub-node from the plurality of nodes.

Example 7 provides a method according to any of the preceding and/or following examples, further comprising: reading module information for the first sub-node; configuring the first sub-node; and reconfiguring the system based on information from each of the plurality of nodes.

Example 8 provides a method according to any of the preceding and/or following examples, wherein the plurality of nodes is a first plurality of nodes, wherein the first plurality of nodes plus the at least one newer sub-node is a second plurality of nodes, and the further comprising, when the at least one newer sub-node has been added: reading module information for the at least one newer sub-node; configuring the at least one newer sub-node; and reconfiguring the system based on information from each of the second plurality of nodes.

Example 9 provides a system for node discovery and configuration, comprises: a daisy-chained network of nodes including a plurality of nodes; a host configured to: discover at least one new sub-node added to the plurality of nodes; read module information for the at least one new sub-node; configure the at least one new sub-node; configure the system including the daisy-chained network based on information from each of the plurality of nodes; and periodically trigger a discovery attempt, wherein the discovery attempt includes determining whether at least one newer sub-node has been added to the daisy-chained network.

Example 10 provides a system according to any of the preceding and/or following examples, wherein at least one new sub-node includes a memory, and the memory includes the module information.

Example 11 provides a system according to any of the preceding and/or following examples, wherein the host is configured to use the module information to find stored code for configuring the at least one new sub-node.

Example 12 provides a system according to any of the preceding and/or following examples, wherein the module information includes at least one of vendor information, product information, version information, model information, capability information, serial number, make information, configuration information, routing information, authentication information, and calibration coefficients.

Example 13 provides a system according to any of the preceding and/or following examples, wherein the host is further configured to determine an access method for the module information.

Example 14 provides a system according to any of the preceding and/or following examples, wherein the system includes a plurality of slots and wherein the host is further configured to assigned at least one of the plurality of slots to each of the plurality of sub-nodes.

Example 15 provides a method for finding configuration information for a sub-node in a daisy-chained network, comprises: determining a module information access method; reading a module identifier; determining whether the module identifier matches with an expected value; reading module information via the access method; determining register settings for the sub-node based on the module information; applying register settings to the sub-node; and assigning at least one slot to the node.

Example 16 provides a method according to any of the preceding and/or following examples, further comprising writing sub-node information to a main node.

Example 17 provides a method according to any of the preceding and/or following examples, further comprising assigning an audio channel to the sub-node and communicating the audio channel assignment to a main node.

Example 18 provides a method according to any of the preceding and/or following examples, further comprising applying sub-node peripheral register settings to at least one sub-node peripheral device.

Example 19 provides a method according to any of the preceding and/or following examples, further comprising determining whether there is an additional sub-node and configuring the additional sub-node.

Example 20 provides a method according to any of the preceding and/or following examples, wherein reading module information comprises reading at least one of version information, vendor information, product information, capability information, serial number, make information, model information, configuration information, routing information, authentication information, and calibration coefficients.

Example 21 is a method for self-discovery and self-configuration of daisy-chained network nodes (e.g., in a system including a single main node and multiple sub nodes), in accordance with any of the embodiments disclosed herein.

Example 22 provides a method according to any of the preceding and/or following examples and may further specify that overall system configuration information is created from information stored at each node.

Example 23 provides a method according to any of the preceding and/or following examples, and may further specify that the information stored at each node is accessed by pin strapping, on-chip memory (e.g., read-only memory (ROM), OTP, electrically erasable programmable ROM (EEPROM), Flash, etc.), off-chip memory (e.g., I2C/SPI-accessible), or a local microcontroller unit (MCU) memory (e.g., conveyed through mailbox commands over I2C or SPI).

Example 24 is a method to find configuration information from an array of possible sources for a node in a daisy-chained network, in accordance with any of the embodiments disclosed herein.

Example 25 provides a method according to any of the preceding and/or following examples, and further specifies that the configuration information includes the capability of a node.

Example 26 is a method for an MCU in a main node to automatically configure a daisy-chained node system based on the configuration information of each node, in accordance with any of the embodiments disclosed herein.

Example 27 provides a method according to any of the preceding and/or following examples, and may further specify that the configuration takes place via local interfaces.

Example 28 provides a method according to any of the preceding and/or following examples, and may further specify that the configuration includes the communication of audio channel assignments within the system (e.g., for audio routing).

Example 29 provides a method according to any of the preceding and/or following examples, and may further specify that the configuration information includes calibration coefficients.

Example 30 is a method for periodically detecting whether a node joined has joined a daisy-chained system and/or if a node has disconnected from the daisy-chained system, in accordance with any of the embodiments disclosed herein.

Example 31 is a method of becoming a main node in a daisy-chained system, in accordance with any of the embodiments disclosed herein.

Example 32 is a method of becoming a sub node in a daisy-chained system, in accordance with any of the embodiments disclosed herein.

Example 33 is a method of finding module information for a node in a daisy-chained system, in accordance with any of the embodiments disclosed herein.

Example 34 is a method of configuring the nodes in a daisy-chained system based at least in part on module information provided by one or more nodes, in accordance with any of the embodiments disclosed herein.

Example 35 provides a method according to any of the preceding and/or following examples, and may further specify that the configuration includes calculating global system parameters based at least in part on the module information.

Example 36 includes the subject matter of any of examples 1-35, and further specifies that at least one device includes a microphone.

Example 37 includes the subject matter of any of examples 1-36, and further specifies that at least one device includes a transceiver.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present disclosure.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

The above-described embodiments may be implemented in any of numerous ways. One or more aspects and embodiments of the present application involving the performance of processes or methods may utilize program instructions executable by a device (e.g., a computer, a processor, or other device) to perform, or control performance of, the processes or methods.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above.

The computer readable medium or media may be transportable, such that the program or programs stored thereon may be loaded onto one or more different computers or other processors to implement various ones of the aspects described above. In some embodiments, computer readable media may be non-transitory media.

Note that the activities discussed above with reference to the FIGURES which are applicable to any integrated circuit that involves signal processing (for example, gesture signal processing, video signal processing, audio signal processing, analog-to-digital conversion, digital-to-analog conversion), particularly those that can execute specialized software programs or algorithms, some of which may be associated with processing digitized real-time data.

In some cases, the teachings of the present disclosure may be encoded into one or more tangible, non-transitory computer-readable mediums having stored thereon executable instructions that, when executed, instruct a programmable device (such as a processor or DSP) to perform the methods or functions disclosed herein. In cases where the teachings herein are embodied at least partly in a hardware device (such as an ASIC, IP block, or SoC), a non-transitory medium could include a hardware device hardware-programmed with logic to perform the methods or functions disclosed herein. The teachings could also be practiced in the form of Register Transfer Level (RTL) or other hardware description language such as VHDL or Verilog, which can be used to program a fabrication process to produce the hardware elements disclosed.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, an FPGA, an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, processors may store information in any suitable type of non-transitory storage medium (for example, random access memory (RAM), read only memory (ROM), FPGA, EPROM, electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe.

Any of the memory items discussed herein should be construed as being encompassed within the broad term 'memory.' Similarly, any of the potential processing elements, modules, and machines described herein should be construed as being encompassed within the broad term 'microprocessor' or 'processor.' Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a personal digital assistant (PDA), a smart phone, a mobile phone, an iPad, or any other suitable portable or fixed electronic device.

Also, a computer may have one or more input and output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Computer-executable instructions may be in many forms, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

The terms "program" or "software" are used herein in a generic sense to refer to any type of computer code or set of computer-executable instructions that may be employed to program a computer or other processor to implement various aspects as described above. Additionally, it should be appreciated that according to one aspect, one or more computer programs that when executed perform methods of the present application need not reside on a single computer or processor, but may be distributed in a modular fashion among a number of different computers or processors to implement various aspects of the present application.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code may be executed on any suitable processor or collection of processors, whether provided in a single computer or distributed among multiple computers.

Computer program logic implementing all or part of the functionality described herein is embodied in various forms, including, but in no way limited to, a source code form, a computer executable form, a hardware description form, and various intermediate forms (for example, mask works, or forms generated by an assembler, compiler, linker, or locator). In an example, source code includes a series of computer program instructions implemented in various programming languages, such as an object code, an assembly language, or a high-level language such as OpenCL, RTL, Verilog, VHDL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In some embodiments, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc.

Other components such as external storage, additional sensors, controllers for audio/video display, and peripheral devices may be attached to the board as plug-in cards, via cables, or integrated into the board itself. In another example embodiment, the electrical circuits of the FIGURES may be implemented as standalone modules (e.g., a device with associated components and circuitry configured to perform a specific application or function) or implemented as plug-in modules into application-specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this disclosure.

In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Interpretation of Terms

All definitions, as defined and used herein, should be understood to control over dictionary definitions, definitions in documents incorporated by reference, and/or ordinary meanings of the defined terms. Unless the context clearly requires otherwise, throughout the description and the claims:

"comprise," "comprising," and the like are to be construed in an inclusive sense, as opposed to an exclusive or exhaustive sense; that is to say, in the sense of "including, but not limited to".

"connected," "coupled," or any variant thereof, means any connection or coupling, either direct or indirect, between two or more elements; the coupling or connection between the elements can be physical, logical, or a combination thereof.

"herein," "above," "below," and words of similar import, when used to describe this specification shall refer to this specification as a whole and not to any particular portions of this specification.

"or," in reference to a list of two or more items, covers all of the following interpretations of the word: any of the items in the list, all of the items in the list, and any combination of the items in the list.

The singular forms "a", "an" and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined.

Elements other than those specifically identified by the "and/or" clause may optionally be present, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the term "between" is to be inclusive unless indicated otherwise. For example, "between A and B" includes A and B unless indicated otherwise.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke 35 U.S.C. § 112(f) as it exists on the date of the filing hereof unless the words "means for" or "steps for" are specifically used in the particular claims; and (b) does not intend, by any statement in the disclosure, to limit this disclosure in any way that is not otherwise reflected in the appended claims.

The present invention should therefore not be considered limited to the particular embodiments described above. Various modifications, equivalent processes, as well as numerous structures to which the present invention may be applicable, will be readily apparent to those skilled in the art to which the present invention is directed upon review of the present disclosure.

What is claimed is:

1. A method for node discovery and configuration in a daisy-chained network including a plurality of nodes, comprising:
- discovering, by a host that is distinct from the plurality of nodes, at least one new sub-node has been added to the plurality of nodes, wherein the discovering comprises the host querying each node in the daisy-chained network and determining a number of nodes in the daisy-chained network;
- reading module information for the at least one new sub-node;
- configuring the at least one new sub-node;
- configuring a system including the daisy-chained network, based on information from each of the plurality of nodes; and
- periodically triggering a discovery attempt, wherein the discovery attempt including determining whether at least one newer sub-node has been added to the daisy-chained network.

2. The method of claim 1, wherein determining at least one new sub-node has been added to the plurality of nodes further comprises bus self-discovery, and wherein a controller of the host queries the plurality of nodes present in the daisy-chained network.

3. The method of claim 2, wherein the bus self-discovery occurs at system start up.

4. The method of claim 2, wherein the bus-self-discovery includes determining the number of nodes in the plurality of nodes.

5. The method of claim 2, wherein the bus self-discovery ends when at least one of the following occurs: no new node for the host to discover, a time-out, or a short of cables.

6. The method of claim 1, further comprising detecting a reconfiguration of a first sub-node from the plurality of nodes.

7. The method of claim 6, further comprising:
- reading module information for the first sub-node;
- configuring the first sub-node; and
- reconfiguring the system based on information from the first sub-node and each remaining node of the plurality of nodes.

8. The method of claim 1, wherein the plurality of nodes is a first plurality of nodes and further comprising:
- detecting a disconnection of a current node from the first plurality of nodes, and
- reconfiguring the system based on information from each of a second plurality of nodes, wherein the second plurality of nodes includes connected nodes from the first plurality of nodes.

9. The method of claim 1, wherein the plurality of nodes is a first plurality of nodes, wherein the first plurality of nodes plus the at least one newer sub-node is a second plurality of nodes, and further comprising, when the at least one newer sub-node has been added:
- reading module information for the at least one newer sub-node;
- configuring the at least one newer sub-node; and
- reconfiguring the system based on information from each of the second plurality of nodes.

10. A system for node discovery and configuration, comprising:
- a daisy-chained network of nodes including a plurality of nodes; and a host that is distinct from the plurality of nodes, the host configured to:

discover at least one new sub-node added to the plurality of nodes, wherein to discover the at least one new sub-node the host is configured to query each node in the daisy-chained network and determine a number of nodes in the daisy-chained network;

read module information for the at least one new sub-node;

configure the at least one new sub-node;

configure the system including the daisy-chained network based on information from each of the plurality of nodes; and periodically trigger a discovery attempt, wherein the discovery attempt includes determining whether at least one newer sub-node has been added to the daisy-chained network.

11. The system of claim 10, wherein the at least one new sub-node includes a memory, and the memory includes the module information.

12. The system of claim 11, wherein the host is configured to use the module information to find stored code for configuring the at least one new sub-node.

13. The system of claim 11, wherein the module information includes at least one of vendor information, product information, version information, model information, capability information, serial number, make information, configuration information, routing information, authentication information, and calibration coefficients.

14. The system of claim 10, wherein the host is further configured to determine an access method for reading the module information.

15. The system of claim 10, further comprising a plurality of slots, and wherein the host is further configured to assign at least one of the plurality of slots to each of the plurality of nodes.

16. A method for finding configuration information for a sub-node in a daisy-chained network, comprising:

discovering, by a host distinct from a plurality of nodes in the daisy-chained network, the sub-node has been added to the plurality of nodes, wherein the discovering comprises the host querying each node in the daisy-chained network and determining a number of nodes in the daisy-chained network;

determining a module information access method for reading module information for the sub-node;

reading a module identifier;

determining whether the module identifier matches with an expected value;

reading the module information via the module information access method;

determining register settings for the sub-node based on the module information;

applying the register settings to the sub-node; and assigning at least one slot to the sub-node.

17. The method of claim 16, further comprising writing sub-node information to a main node in the daisy-chained network.

18. The method of claim 16, wherein reading module information comprises reading at least one of version information, vendor information, product information, capability information, serial number, make information, model information, configuration information, routing information, authentication information, and calibration coefficients.

19. The method of claim 16, further comprising applying sub-node peripheral register settings to at least one sub-node peripheral device.

20. The method of claim 16, further comprising determining whether there is an additional sub-node in the daisy-chained network and configuring the additional sub-node.

21. The method of claim 16, further comprising assigning an audio channel to the sub-node and communicating the audio channel assignment to a main node in the daisy-chained network.

22. The method of claim 16, wherein the module information is read from one of an Erasable Programmable Read-Only Memory (EPROM) in the sub-node or a microcontroller of the sub-node.

* * * * *